US012084301B2

(12) United States Patent
Oda et al.

(10) Patent No.: US 12,084,301 B2
(45) Date of Patent: Sep. 10, 2024

(54) MULTIFUNCTION MACHINE, MAINTENANCE METHOD OF MULTIFUNCTION MACHINE, AND MANUFACTURING METHOD OF MULTIFUNCTION MACHINE

(71) Applicant: SEIKO EPSON CORPORATION, Tokyo (JP)

(72) Inventors: Koji Oda, Shiojiri (JP); Koji Shimizu, Shiojiri (JP); Yuji Misawa, Matsumoto (JP); Takeshi Aoki, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 212 days.

(21) Appl. No.: 17/656,954

(22) Filed: Mar. 29, 2022

(65) Prior Publication Data

US 2022/0315373 A1 Oct. 6, 2022

(30) Foreign Application Priority Data

Mar. 30, 2021 (JP) ................................ 2021-056786

(51) Int. Cl.
*B65H 31/22* (2006.01)
*B65H 31/02* (2006.01)
*G03G 21/16* (2006.01)

(52) U.S. Cl.
CPC ............ *B65H 31/22* (2013.01); *B65H 31/02* (2013.01); *G03G 21/1619* (2013.01); *B65H 2301/4212* (2013.01); *B65H 2402/10* (2013.01); *B65H 2402/32* (2013.01); *B65H 2402/40* (2013.01); *B65H 2402/441* (2013.01); *B65H 2601/324* (2013.01); *B65H 2601/61* (2013.01); *B65H 2801/06* (2013.01)

(58) Field of Classification Search
None
See application file for complete search history.

(56) References Cited

U.S. PATENT DOCUMENTS 5,419,544 A * 5/1995 Ono ...................... B65H 1/266 271/157
8,783,854 B2 7/2014 Ozaki et al.
9,259,948 B2 2/2016 Wanibe
(Continued)

FOREIGN PATENT DOCUMENTS

CN 102248810 11/2011
CN 104057702 9/2014
JP 2016-107622 A 6/2016

*Primary Examiner* — Prasad V Gokhale
(74) *Attorney, Agent, or Firm* — WORKMAN NYDEGGER

(57) ABSTRACT

A main body frame of a multifunction machine has first and second frames of which surfaces parallel to a Z-axis face each other. A recording head is disposed between the first and the second frames and fixed to the main body frame. An ejection tray is fixed to the main body frame on a +Z direction with respect to the recording head. A scanner is fixed to the main body frame on the +Z direction with respect to the ejection tray and forms an ejection space with the ejection tray. The recording head performs recording on a medium which is being transported toward a first direction, which is an in-plane direction of the first frame. The ejection tray is configured to be removed toward a second direction, which is the in-plane direction of the first frame, in a state where the scanner is fixed to the main body frame.

16 Claims, 19 Drawing Sheets

(56) References Cited

U.S. PATENT DOCUMENTS

| | | | | |
|---|---|---|---|---|
| 2007/0085257 | A1* | 4/2007 | Kang | B65H 31/22 270/58.07 |
| 2011/0242247 | A1 | 10/2011 | Ozaki et al. | |
| 2014/0147183 | A1* | 5/2014 | Koshida | G03G 15/657 399/388 |
| 2014/0285578 | A1 | 9/2014 | Wanibe | |
| 2015/0273891 | A1* | 10/2015 | Tanjo | B41J 29/13 347/104 |
| 2016/0282803 | A1* | 9/2016 | Osaki | B65H 31/02 |
| 2018/0284682 | A1* | 10/2018 | Tsukijima | G03G 15/1615 |
| 2021/0380365 | A1* | 12/2021 | Yamada | B65H 33/08 |

* cited by examiner

MULTIFUNCTION MACHINE, MAINTENANCE METHOD OF MULTIFUNCTION MACHINE, AND MANUFACTURING METHOD OF MULTIFUNCTION MACHINE

The present application is based on, and claims priority from JP Application Serial Number 2021-056786, filed Mar. 30, 2021, the disclosure of which is hereby incorporated by reference herein in its entirety.

BACKGROUND

1. Technical Field

The present disclosure relates to a multifunction machine, a maintenance method of the multifunction machine, and a manufacturing method of a multifunction machine.

2. Related Art

JP-A-2016-107622 discloses a multifunction machine having a replaceable recording section. In this multifunction machine, when replacing the recording section, the operator removes a scanner section, an automatic paper feeding device, and an operation section from an apparatus main body of a printer section. As a result of this removal, the recording section is removed from an opening formed in the apparatus main body. Then, the replaced recording section is attached to the inside of the apparatus main body through the opening. After this, the operation section, the automatic paper feeding device, and the scanner section are attached to the apparatus main body.

The multifunction machine described in JP-A-2016-107622 has a problem that the scanner section and the like need to be removed in order to replace the recording section, and the replaceability is poor.

SUMMARY

According to an aspect of the present disclosure, there is provided a multifunction machine including when in a Z-axis orthogonal to an installation surface of the multifunction machine, a multifunction machine side with respect to the installation surface is defined as a +Z direction and an opposite side is defined as a −Z direction, a main body frame having a first frame and a second frame which respectively have surfaces parallel to the Z-axis and face each other; a recording head disposed between the first frame and the second frame and supported by the main body frame; an ejection tray which is fixed to the main body frame on the +Z direction with respect to the recording head and on which a medium ejected after being recorded by the recording head is placed; and a scanner fixed to the main body frame on the +Z direction with respect to the ejection tray and forming an ejection space with the ejection tray, in which the recording head performs recording on the medium transported toward a first direction, which is an in-plane direction of the first frame, and the ejection tray is configured to be removed toward a second direction, which is the in-plane direction of the first frame, in a state where the scanner is fixed to the main body frame.

According to another aspect of the present disclosure, there is provided a maintenance method of the multifunction machine, the method including: removing the ejection tray toward the second direction, which is the in-plane direction of the first frame, in a state where the scanner is fixed to the main body frame; and removing the recording head toward a third direction, which is the in-plane direction of the first frame, in a state where the scanner is fixed to the main body frame.

According to still another aspect of the present disclosure, there is provided a manufacturing method of a multifunction machine, the method including: attaching the recording head toward a third direction, which is the in-plane direction of the first frame, in a state where the scanner is fixed to the main body frame; and attaching the ejection tray toward the second direction, which is the in-plane direction of the first frame, in a state where the scanner is fixed to the main body frame.

DESCRIPTION OF EXEMPLARY EMBODIMENTS

Figure 1:
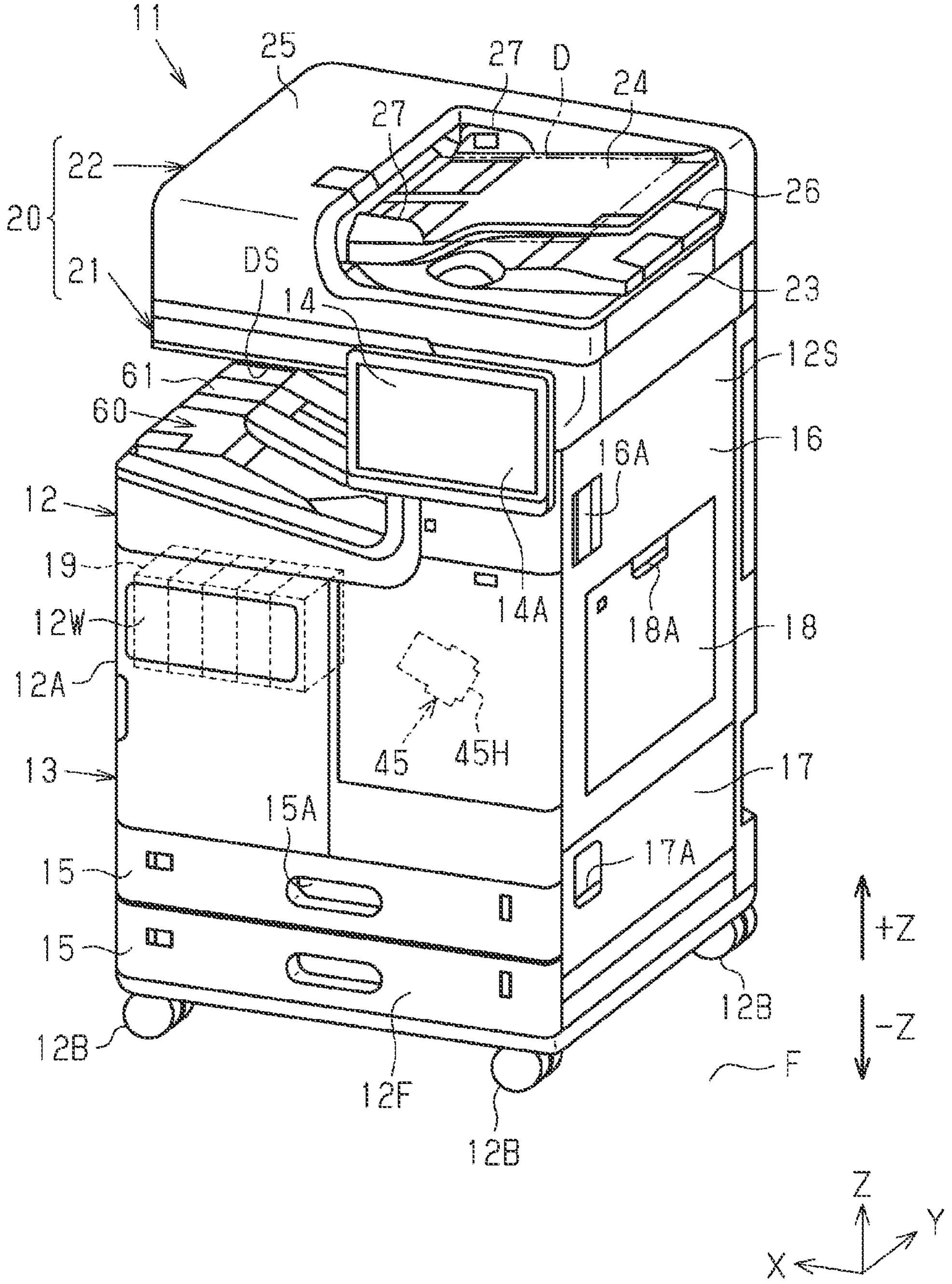
FIG. 1 is a perspective view illustrating a multifunction machine according to an embodiment.

Hereinafter, one embodiment will be described with reference to the drawings. A multifunction machine has a plurality of functions, for example, an image reading function (scanning function) of outputting an image obtained by reading a document as image data, a copying function of printing the image obtained by reading the document on a medium, and a printing function of printing characters or images on the medium. The multifunction machine may have a facsimile function.

In the drawings, it is assumed that a multifunction machine 11 is placed on a horizontal installation surface F. Of Z axes orthogonal to the installation surface F of the multifunction machine 11, the multifunction machine 11 side with respect to the installation surface F is a +Z direction and the opposite side is a −Z direction. The two axes orthogonal to each other in an in-plane direction of the installation surface F are an X-axis and a Y-axis, respectively. The directions parallel to each of the X-axis, Y-axis, and Z-axis are called an X-axis direction, a Y-axis direction, and a Z-axis direction. The X-axis direction includes both a +X direction and a −X direction. The Y-axis direction includes both a +Y direction and a −Y direction. The Z-axis direction includes both a +Z direction and a −Z direction. The Z-axis direction, which is a direction parallel to the Z-axis, is also referred to as a vertical direction Z. The X-axis direction is a width direction when the multifunction machine 11 is viewed from the front surface. Therefore, the direction parallel to the X-axis is also referred to as a width direction X. Here, the front surface of the multifunction machine 11 is a surface on a side where an operation section 14 operated by a user to give an instruction to the multifunction machine 11 is positioned. The Y-axis is parallel to a depth direction of the multifunction machine 11. Therefore, the Y-axis direction is also referred to as a depth direction Y.

Configuration of Multifunction Machine

As illustrated in FIG. 1, the multifunction machine 11 includes a rectangular parallelepiped apparatus main body 12 and a scanner 20 disposed at the upper portion of the apparatus main body 12. The scanner 20 includes a document holder 21 on which a document is placed, and an automatic document feeding section 22 (Auto Document Feeder (ADF)) as an example of an opening/closing body provided to be openable and closable with respect to the document holder 21. The automatic document feeding section 22 is configured to be openable and closable with respect to the document holder 21 around a rotation fulcrum. The automatic document feeding section 22 has a function of automatically feeding documents. The document holder 21 is fixed to the upper end portion of the apparatus main body 12. The automatic document feeding section 22 of the present embodiment is integrally mounted on a document holder cover 23. In other words, the lower portion of the automatic document feeding section 22 facing the document holder 21 is the document holder cover 23. Therefore, the document holder cover 23 is opened and closed by rotating the automatic document feeding section 22 with respect to the document holder 21 around the rotation fulcrum.

The apparatus main body 12 configures a printer section 13. The multifunction machine 11 has a configuration in which the printer section 13, the document holder 21, and the automatic document feeding section 22 are stacked in this order from the lower side in the vertical direction Z. The multifunction machine 11 is installed on the installation surface F in a state where a plurality of casters 12B provided at the bottom portion of the apparatus main body 12 are grounded.

The scanner 20 is configured to be capable of reading images such as characters or photographs recorded on a document D. The automatic document feeding section 22 has a document tray 24 on which the document D (two-dot chain line in FIG. 1) can be placed. As the reading method of the document D, the scanner 20 uses a feeding method for reading the document D fed from the document tray 24 by the automatic document feeding section 22 and a flatbed method for reading the document D placed on the document holder 21 (refer to FIG. 3). The automatic document feeding section 22 includes the document tray 24 on which the document D is placed, a feeding mechanism 25 for feeding the document placed on the document tray 24, and an ejection tray 26 on which the document D read by the feeding method is loaded. The document tray 24 may have a pair of edge guides 27 that are operated when positioning the document D in the width direction. When the document D is read by the flatbed method, the document D is placed on the upper surface of the document holder 21 exposed when the automatic document feeding section 22 is opened, and the document D is pressed by the document holder cover 23 by closing the automatic document feeding section 22. Then, the scanner 20 reads the document D on the document holder 21.

The operation section 14 that is operated when giving an instruction to the multifunction machine 11 is provided at the upper portion of a front surface 12F of the apparatus main body 12. The operation section 14 may be an operation panel having a display section 14A. The display section 14A may have, for example, a screen made of a touch panel. The touch panel is a display panel on which instructions can be given to the multifunction machine 11 by touching the screen. Further, the operation section 14 may have an operation button or may have a configuration including only the operation button. In the present example, a surface on a side facing the surface (for example, a panel surface) of the operation section 14 in the apparatus main body 12 is a front surface.

The multifunction machine 11 includes a cassette 15 (medium accommodation section) for accommodating a plurality of media. A plurality of media M (refer to FIG. 2) are accommodated in the cassette 15 in a loaded state. The multifunction machine 11 includes a plurality of stages (for example, two stages) of cassettes 15 arranged in a state of overlapping in the vertical direction Z at the lower portion of the apparatus main body 12. The plurality of cassettes 15 are inserted from the apparatus main body 12 in an attachable/detachable state. The cassette 15 has a handle 15A used when the user performs a drawing operation. The number of stages of the cassette 15 is not limited to two, and may be one, three, four, five, or the like. The plurality of stages of the cassette 15 may be an extension unit in which a part or all of the cassettes are optionally extended.

As illustrated in FIG. 1, a side surface 12S of the apparatus main body 12 is provided in a state where the first cover 16 and the second cover 17 are in an openable and closable state. Each of the covers 16 and 17 has handles 16A and 17A used when the user opens and closes the cover. Each of the covers 16 and 17 is used by being opened and closed to eliminate the jam of the medium M when the jam of the medium M occurs on a transport path T in the apparatus main body 12. The first cover 16 includes a feeding tray 18 on which a medium can be placed in the openable and closable state. The user can feed the medium placed on the feeding tray 18 by opening the feeding tray 18 using the handle 18A. Each of the covers 16 and 17 configures a housing 12A of the printer section 13 together with a main body frame 50 (refer to FIGS. 3 and 4) and an exterior member 12C (refer to FIG. 3) that configure the apparatus main body 12, which will be described later. The details of the main body frame 50 will be described later.

As illustrated in FIG. 1, a recording head 45 for performing recording on a medium (refer to FIG. 2) is disposed in the housing 12A. The recording head 45 performs recording at a recording position in the middle of the transport path T (refer to FIG. 2) with respect to the medium M fed from the cassette 15 or the medium M fed from the feeding tray 18. A liquid supply source 19 for accommodating a liquid such as ink is accommodated in the housing 12A. The recording head 45 has a head section 45H for performing the recording on the medium M using a liquid such as ink supplied from the liquid supply source 19. The user can visually recognize the remaining amount of the liquid supply source 19 through a window section 12W provided in the housing 12A. The liquid supply source 19 may be configured with a plurality of tanks or a plurality of cartridges in which liquids such as different types of ink are accommodated.

A recessed ejection space DS is provided between the apparatus main body 12 and the scanner 20. An ejection tray 61 is disposed at the bottom portion of the ejection space DS. The recorded medium M ejected from an ejection port 12D (refer to FIG. 4) of the apparatus main body 12 is loaded on the upper surface of the ejection tray 61.

Configuration of Printer Section

Next, a configuration of the printer section 13 will be described with reference to FIG. 2.

A transport mechanism 30 for transporting the medium M along the transport path T is provided in the apparatus main body 12. In the apparatus main body 12, a medium width sensor 101 that detects the medium M transported along the transport path T, the recording head 45 that performs recording on the medium M, a liquid supply source 19 that supplies a liquid such as ink to the recording head 45, a waste liquid storage section 103 for storing waste liquid such as ink, and a control section 100 that controls the operation of each section of the multifunction machine 11 are provided. The recording head 45 includes the head section 45H that discharges a liquid such as ink to the medium M. The head section 45H discharges a liquid such as ink supplied from the liquid supply source 19 through a tube (not illustrated) from a nozzle (not illustrated).

Figure 2:
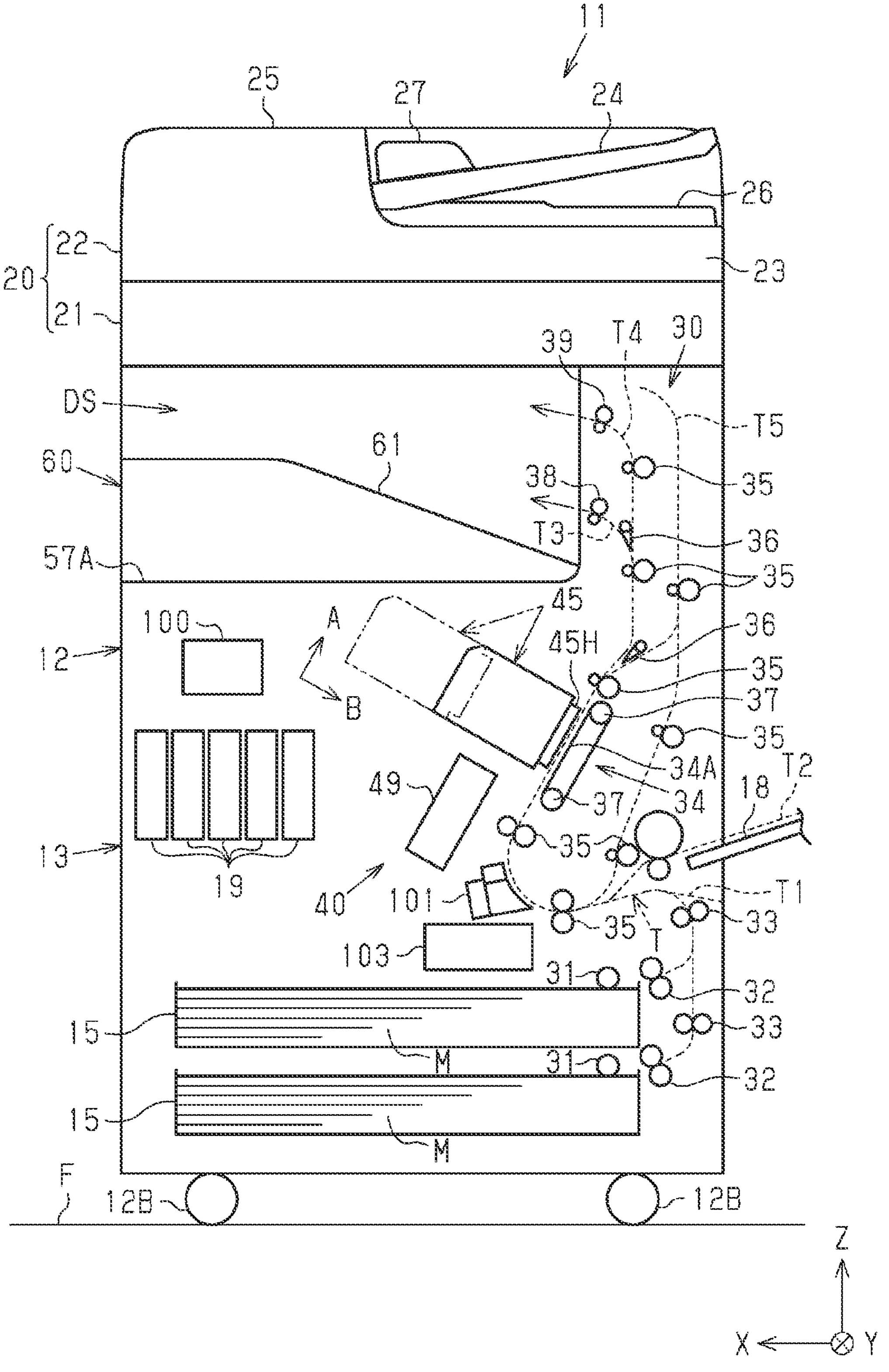
FIG. 2 is a schematic front sectional view illustrating a configuration of a printer section of the multifunction machine.

In the example illustrated in FIG. 2, the head section 45H is disposed in a posture tilted with respect to the horizontal. In other words, in the head section 45H, the nozzle surface through which the nozzle for discharging the liquid opens is disposed in a posture tilted with respect to the horizontal. The head section 45H faces a transport surface of a transport unit 34. The angle at which the head section 45H is tilted with respect to the horizontal can be appropriately changed. For example, the head section 45H and the transport unit 34 may be arranged horizontally (tilting angle 0°). The transport unit 34 includes, for example, a pair of rollers 37 and a transport belt 34A wound around the outer periphery of the pair of rollers 37. Of the surfaces of the transport belt 34A, the front surface on which the medium M is transported is the transport surface. The recording head 45 may be a recording head of a recording method other than the head section 45H that discharges the liquid. For example, the recording head 45 such as a dot impact recording method, a thermal recording method, or a laser recording method for recording with toner may be used. The recording head 45 of the present embodiment is a line head of a line recording method.

In the multifunction machine 11, the medium M is transported through the transport path T illustrated by the broken line in FIG. 1. The A-B coordinate system illustrated on the X-Z plane is a rectangular coordinate system. The A direction is a transport direction of the medium M at the recording position facing the head section 45H that configures the recording head 45 in the transport path T. The direction toward the upstream in the A direction is referred to as a −A direction, and the direction toward the downstream is referred to as a +A direction. In the present embodiment, the A direction is a direction tilted such that the +A direction is positioned close to the +Z direction than the −A direction. Specifically, the direction is tilted in the range of 50° to 70° with respect to the horizontal direction, and more specifically, the direction is tilted approximately 60°. As described above, the transport direction of the medium M at the recording position of the recording head 45 is an inclined direction intersecting both the horizontal direction and the vertical direction Z.

The B direction is an example of a moving direction in which the recording head 45 having the head section 45H moves. In other words, the B direction is a moving direction in which the recording head 45 moves forward and backward with respect to the transport unit 34. In the B direction, a direction in which the head section 45H approaches the transport path T is referred to as a +B direction, and a direction away from the transport path T is referred to as a −B direction. In the −B direction, the recording head 45 is directed diagonally upward along the direction away from the transport surface of the transport unit 34. In the present embodiment, the B direction is a direction tilted such that the −B direction is positioned close to the +Z direction than the +B direction, and is orthogonal to the A direction. The recording head 45 moves in the B direction along a path passing through a plurality of positions including the replacement position illustrated by the two-dot chain line in FIG. 2 and the recording position illustrated by the solid line in FIG. 1. The B direction is a direction in which the recording head 45 is displaced, and is a direction including a component in the Z direction, which is the height direction. The moving direction of the recording head 45 may be any direction that forms a predetermined angle with respect to the horizontal.

The moving direction of the recording head 45 is also referred to as an ascending and descending direction because the moving direction is accompanied by a displacement of the recording head 45 in the vertical direction Z due to the movement and is accompanied by ascending and descending.

The multifunction machine 11 has a housing 12A that configures an exterior part of the apparatus main body 12. The ejection space DS in which the recorded medium M is ejected is formed in the +Z direction from the center of the housing 12A in the Z direction. The plurality of cassettes 15 are attachably and detachably provided on the housing 12A. The plurality of media M are accommodated in the plurality of cassettes 15. The medium M accommodated in each of the cassettes 15 is transported along the transport path T by a pick roller 31, a separation roller pair 32, and a transport roller 33. In the transport path T, a transport path T1 in which the medium M is transported in from the external apparatus and a transport path T2 in which the medium M is transported from the feeding tray 18 provided in the housing 12A are merged.

In the transport path T, the above-described transport unit 34, a plurality of flaps 36 for switching the transport path for the plurality of transport roller pairs 35 for transporting the medium M, and the medium width sensor 101 that detects the width of the medium M in the Y-axis direction are arranged.

The transport path T is curved in a region facing the medium width sensor 101, and extends diagonally upward from the medium width sensor 101, that is, in the A direction. Downstream of the transport unit 34 in the transport path T, a transport path T3 and a transport path T4 toward the ejection space DS, and a reverse path T5 that reverses the front and back of the medium M are provided. The transport mechanism 30 includes an ejecting roller pair 38 that ejects the medium M from the transport path T3, and an ejecting roller 39 that ejects the medium M from the transport path T4. The recorded medium M ejected from the transport path T3 to the ejection space DS by the ejecting roller pair 38 is loaded on the ejection tray 61 of the tray unit 60. The ejection space DS is provided with an ejection tray (not illustrated) in accordance with the transport path T4.

As illustrated in FIG. 2, the apparatus main body 12 includes a cap carriage 49 for maintaining the nozzle of the head section 45H. The cap carriage 49 can reciprocate along the A direction. At the time of non-recording, the cap carriage 49 moves to a position facing the recording head 45 and caps the head section 45H. Cleaning is performed in which a liquid such as ink is forcibly ejected from the nozzle of the head section 45H in a state where the head section 45H is capped. As illustrated in FIG. 2, the recording head 45, a mechanism for moving the recording head 45, the cap carriage 49, a mechanism for moving the cap carriage 49, and a wiper carriage for wiping the nozzle surface where the nozzle of the head section 45H opens (not illustrated) are configured as a motion unit 40 (refer to also FIG. 8), which is a unit body assembled into one.

As illustrated in FIG. 2, the multifunction machine 11 includes the ejection tray 61 that configures the bottom portion of the ejection space DS. The ejection tray 61 is a member having a square plate shape, and has a loading surface 63 on which the ejected medium M is loaded. The ejection tray 61 is provided downstream of the transport unit 34 in the transport path T of the medium M and at a position on the +Z direction with respect to the recording head 45 in the Z-axis direction. FIG. 2 illustrates each component of the multifunction machine 11 in a simplified manner.

The control section 100 includes a central processing unit (CPU), a read only memory (ROM), a random access memory (RAM), and a storage, which are not illustrated. The control section 100 controls the printer section 13 and the scanner 20. The control section 100 controls the transport of the medium M in the multifunction machine 11 and the recording operation of information on the medium M by the recording head 45. The control section 100 controls the automatic document feeding section 22, the reading section, and the like for the scanner 20, and causes the scanner 20 to perform a reading operation of the document D. The control section 100 controls the recording head 45 and the transport mechanism 30 (refer to FIG. 2) with respect to the printer section 13, and controls the transport of the medium M and the recording on the medium M. The control section 100 is not limited to the one that performs software processing for all the processing executed by itself. For example, the control section 100 may include a dedicated hardware circuit (for example, an integrated circuit for a specific application: ASIC) that performs hardware processing for at least a part of the processing executed by itself. In other words, the control section 100 may configure a circuitry including one or more processors that operate according to a computer program (software), one or more dedicated hardware circuits that execute at least a part of various processes, or a combination thereof. The processor includes a CPU and a memory such as a RAM and a ROM, and the memory stores a program code or a command configured to cause the CPU to execute processing. A memory, that is, a computer-readable medium, includes any available medium accessible by a general purpose or dedicated computer.

Next, the configuration of the main body frame 50 and the motion unit 40 will be described with reference to FIG. 3.

Figure 3:
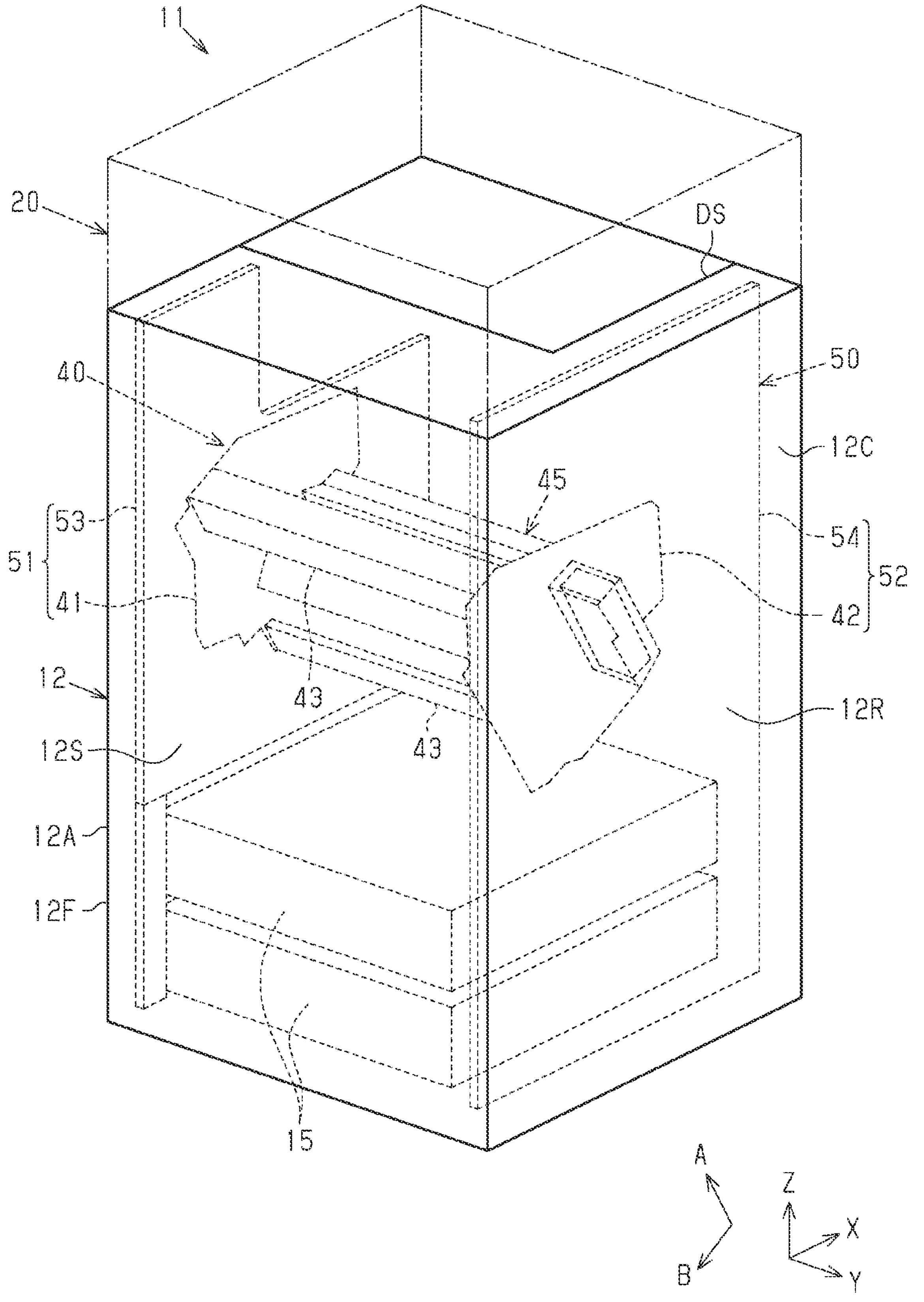
FIG. 3 is a schematic perspective view illustrating a configuration including a main body frame of the multifunction machine.

The motion unit 40 illustrated in FIG. 3 includes the recording head 45 illustrated in FIG. 2, the cap carriage 49 (refer to FIG. 8), and the wiper carriage (not illustrated). The recording head 45 is a unit including the head section 45H, and is provided so as to be capable of driving a motor in the B direction.

As illustrated in FIG. 3, the motion unit 40 includes a first side frame 41 and a second side frame 42 positioned in the +Y direction with respect to the first side frame 41. The first side frame 41 and the second side frame 42 are formed of a metal plate and form a frame surface along an A-B plane.

The first side frame 41 and the second side frame 42 are coupled by a plurality of coupling frames 43 extending in the Y-axis direction. The plurality of coupling frames 43 are formed by bending a metal plate.

In the present embodiment, the plurality of coupling frames 43 are joined to the first side frame 41 and the second side frame 42 by welding.

The plurality of coupling frames 43 are bent such that a part or all of the cross section when being cut in the A-B plane is rectangular. Accordingly, the rigidity of the motion unit 40 is improved as a whole.

As illustrated in FIG. 3, the apparatus main body 12 includes the main body frame 50 and the exterior member 12C. The main body frame 50 has a first frame 51 and a second frame 52 which respectively have surfaces parallel to the Z-axis and face each other. The first frame 51 is positioned at the end portion of the main body frame 50 in the −Y direction and is disposed along the X-Z plane. The second frame 52 is positioned at the end portion of the main body frame 50 in the +Y direction and is disposed along the X-Z plane. The base of the apparatus main body 12 is configured with the first frame 51 and the second frame 52.

The first frame 51 includes a front frame 53 at the end portion of the main body frame 50 in the −Y direction. The second frame 52 includes a rear frame 54 at the end portion of the main body frame 50 in the +Y direction. The front frame 53 and the rear frame 54 are made of a metal material. The motion unit 40 is disposed between the front frame 53 and the rear frame 54, and both end portions thereof in the Y-axis direction are fixed to the front frame 53 and the rear frame 54. In other words, the first side frame 41, which is the end portion in the −Y direction of the motion unit 40, is fixed to the front frame 53, and the second side frame 42, which is the end portion in the +Y direction of the motion unit 40, is fixed to the rear frame 54.

The first frame 51 of the present embodiment is configured with the front frame 53 and the first side frame 41. Further, the second frame 52 of the present embodiment is configured with the rear frame 54 and the second side frame 42. In addition, the front frame 53 and the rear frame 54 are made of a metal material. The motion unit 40 is fixed to the front frame 53 and the rear frame 54 by screws in the present embodiment, but may be fixed by welding.

As illustrated in FIG. 3, the motion unit 40 includes the recording head 45. The recording head 45 is disposed between the first frame 51 and the second frame 52, and is supported by the main body frame 50.

As illustrated in FIG. 3, the first frame 51 is along the X-Z plane parallel to the front surface 12F of the main body frame 50. The transport mechanism 30 illustrated in FIG. 2 transports the medium M at the recording position of the recording head 45 toward the first direction, which is the in-plane direction of the first frame 51. In the present embodiment, this first direction is the A direction. Therefore, in the following, the first direction is also referred to as "first direction A". In this manner, the recording head 45 performs recording on the medium M which is being transported toward the first direction A, which is the in-plane direction of the first frame 51. The first direction is not limited to the A direction, but may be the in-plane direction of the first frame 51.

Figure 4:
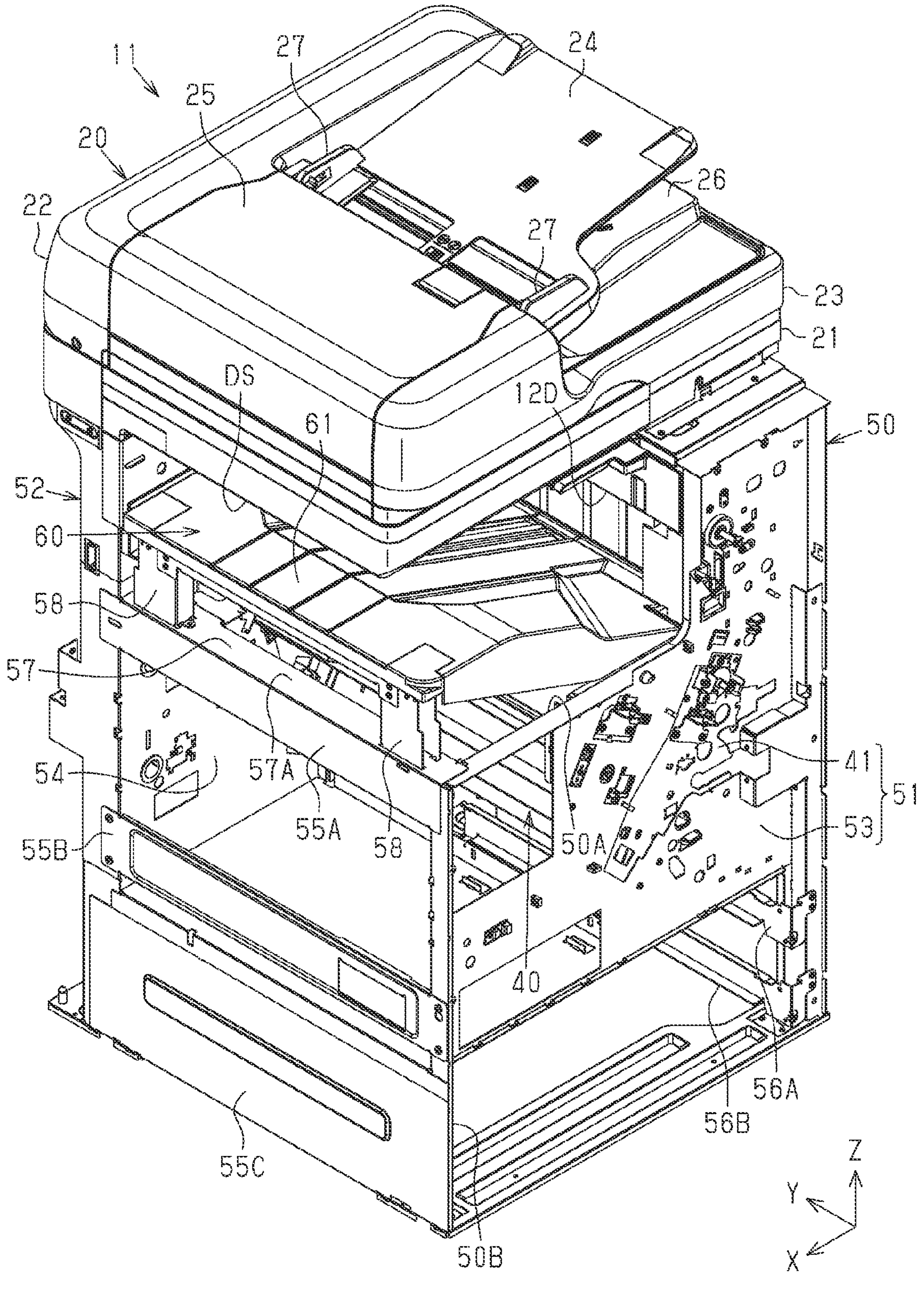
FIG. 4 is a perspective view illustrating a state where an exterior of the multifunction machine is removed.

As illustrated in FIGS. 3 and 4, the first frame 51 that configures the main body frame 50 opens the ejection space DS. The second frame 52 that configures the main body frame 50 covers the ejection space DS. As illustrated in FIG. 3, the apparatus main body 12 opens the ejection space DS on the front surface 12F side thereof and covers the ejection space DS on the back surface 12R side thereof.

As illustrated in FIG. 4, the first frame 51 and the second frame 52 are coupled via a first side plate 55A, a second side plate 55B, and a third side plate 55C extending in the Y-axis direction respectively at different positions in the Z-axis direction at the end portions in the +X direction. The first frame 51 and the second frame 52 are coupled at the end portion in the −X direction via a plurality of side plates 56A and 56B and the like extending in the Y-axis direction respectively at different positions in the Z-axis direction. The plurality of side plates 56A and 56B and the like are arranged at a height avoiding openings (not illustrated) facing the covers 16 and 17 of the main body frame 50.

As illustrated in FIG. 4, the scanner 20 is fixed to the main body frame 50 on the +Z direction with respect to the ejection tray 61. The scanner 20 extends in the +X direction so as to cover the upper side (+Z direction) of the ejection tray 61. Therefore, the scanner 20 forms the ejection space DS with the ejection tray 61.

The main body frame 50 has an opening 50A (refer to also FIG. 5) in a region facing the ejection space DS formed between the apparatus main body 12 and the scanner 20 in the Z-axis direction. The ejection tray 61 is placed at the bottom portion of the ejection space DS with respect to the main body frame 50. The ejection tray 61 is placed on a placement surface 57A configured with at least a part of the surfaces parallel to the X-Y plane surrounding the opening 50A of the main body frame 50 so as to cover the opening 50A of the main body frame 50.

As illustrated in FIG. 4, a placement plate 57 extending in the Y-axis direction is fixed to the end portion of the opening 50A of the main body frame 50 on the +X direction side. The upper surface of the placement plate 57 is the placement surface 57A on which the tray unit 60 is placed in a predetermined posture. The tray unit 60 is supported at a downstream end portion (tip end portion) in the transport direction via a pair of stays 58 fixed onto the placement surface 57A. The pair of stays 58 form a part of the main body frame 50. The surface on which the tray unit 60 is placed on the main body frame 50 may be a surface facing the +Z direction of the peripheral part of the opening 50A, and is not necessarily limited to the placement surface 57A positioned at the end portion of the opening 50A in the +X direction, and including a case of having other placement surfaces, and here, for convenience, the surface is referred to as the placement surface 57A. The main body frame 50 has an opening portion 50B into which the cassette 15 is inserted at the lower portion of the front surface (the surface on the −Y direction).

Figure 5:
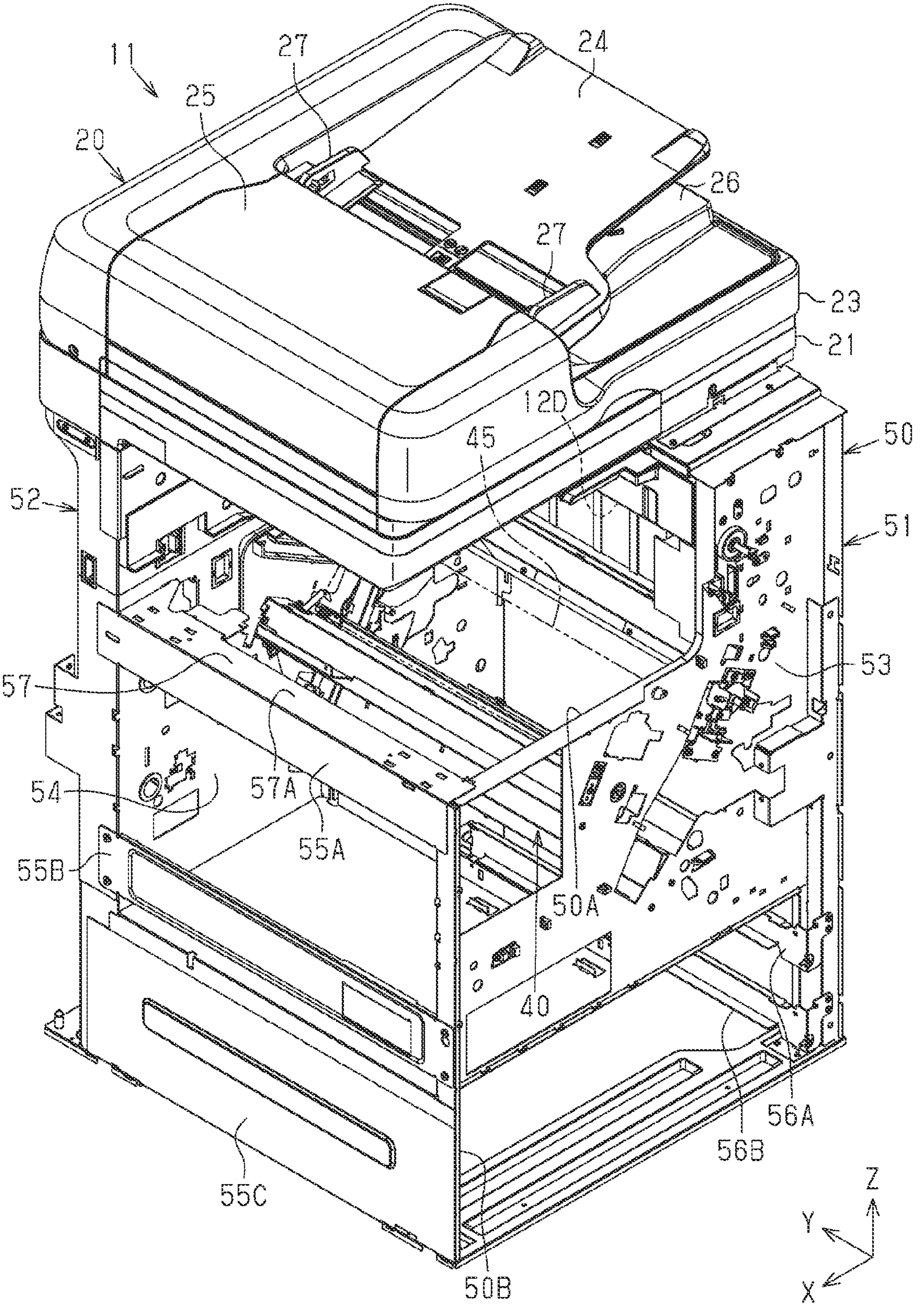
FIG. 5 is a perspective view illustrating a state where a tray unit is removed from the multifunction machine.

FIG. 5 illustrates a state where the tray unit 60 is removed from the multifunction machine 11 illustrated in FIG. 4. As illustrated in FIG. 5, the motion unit 40 including the recording head 45 is disposed in the main body frame 50 at a position below the opening 50A. In other words, the ejection tray 61 illustrated in FIG. 4 is fixed to the main body frame 50 on the +Z direction with respect to the recording head 45. The ejection tray 61 places the medium M ejected after being recorded by the recording head 45. In other words, as illustrated in FIG. 2, the medium M after being recorded by the recording head 45 is transported to the height position of the ejection space DS in the +Z direction along the transport path T3, and then is ejected into the ejection space DS in the +X direction. Therefore, the ejection tray 61 can place the medium M ejected to the ejection space DS after being recorded by the recording head 45 positioned in the −Z direction (downward) from the opening 50A.

The multifunction machine 11 of the present embodiment includes the tray unit 60 in which the ejection tray 61 and a driving source 66 are integrated into a unit. The tray unit 60 is fixed to the main body frame 50 in a removable state. In other words, the tray unit 60 can be attached to and detached from the mounted state (illustrated in FIG. 4) of being placed on the placement surface 57A of the main body frame 50 in a state of covering the opening 50A and the removed state (illustrated in FIG. 5) with the opening 50A exposed. The opening 50A is used as a head outlet for removing the recording head 45 from the main body frame 50 for maintenance such as repair or replacement of the recording head 45. In FIG. 5, the recording head 45 is disposed at the lower back part in the apparatus main body 12 from the opening 50A.

When the recording head 45 moves from the recording position PH1 (refer to FIG. 19) in the −B direction, the recording head 45 moves to an attachment/detachment position PH2 (refer to FIG. 20) corresponding to the opening 50A. In other words, the recording head 45 moves in the −B direction from the recording position illustrated by the solid line in FIG. 2 to the attachment/detachment position illustrated by the two-dot chain line in FIG. 2. In a state where the tray unit 60 illustrated in FIG. 5 is removed, the recording head 45 at the attachment/detachment position can be taken out and attached via the opening 50A exposed at the bottom portion of the ejection space DS.

As illustrated in FIG. 5, in a state where the tray unit 60 is removed, the opening 50A is exposed in the placing region of the tray unit 60 in the main body frame 50. The recording head 45 (illustrated by a two-dot chain line in FIG. 5) of the motion unit 40 is positioned at the back part of the opening 50A. The opening 50A has an opening size in which the recording head 45 having the head section 45H can be removed.

Front Frame and Rear Frame

Figure 6:
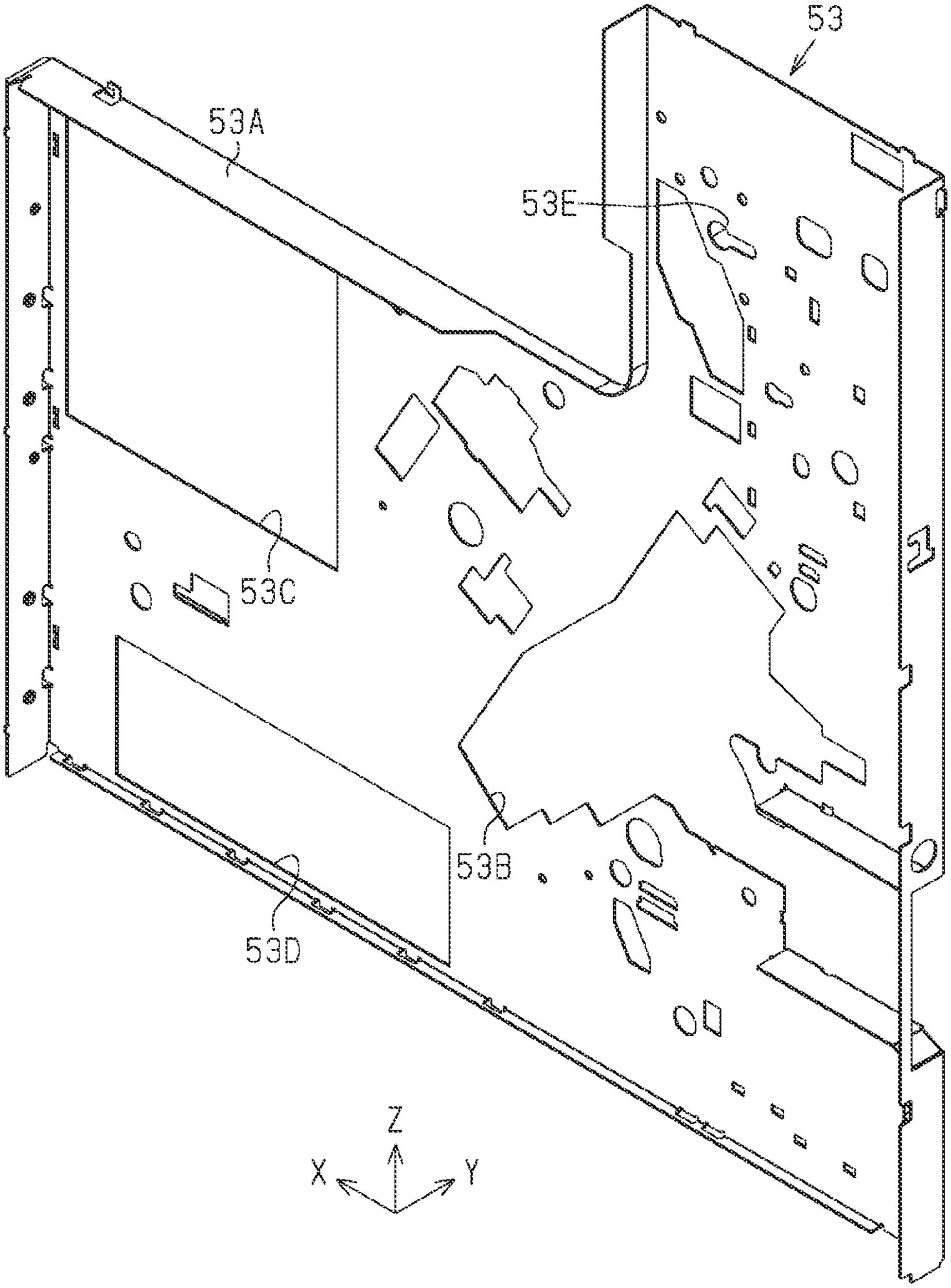
FIG. 6 is a perspective view illustrating a front frame.
Figure 7:
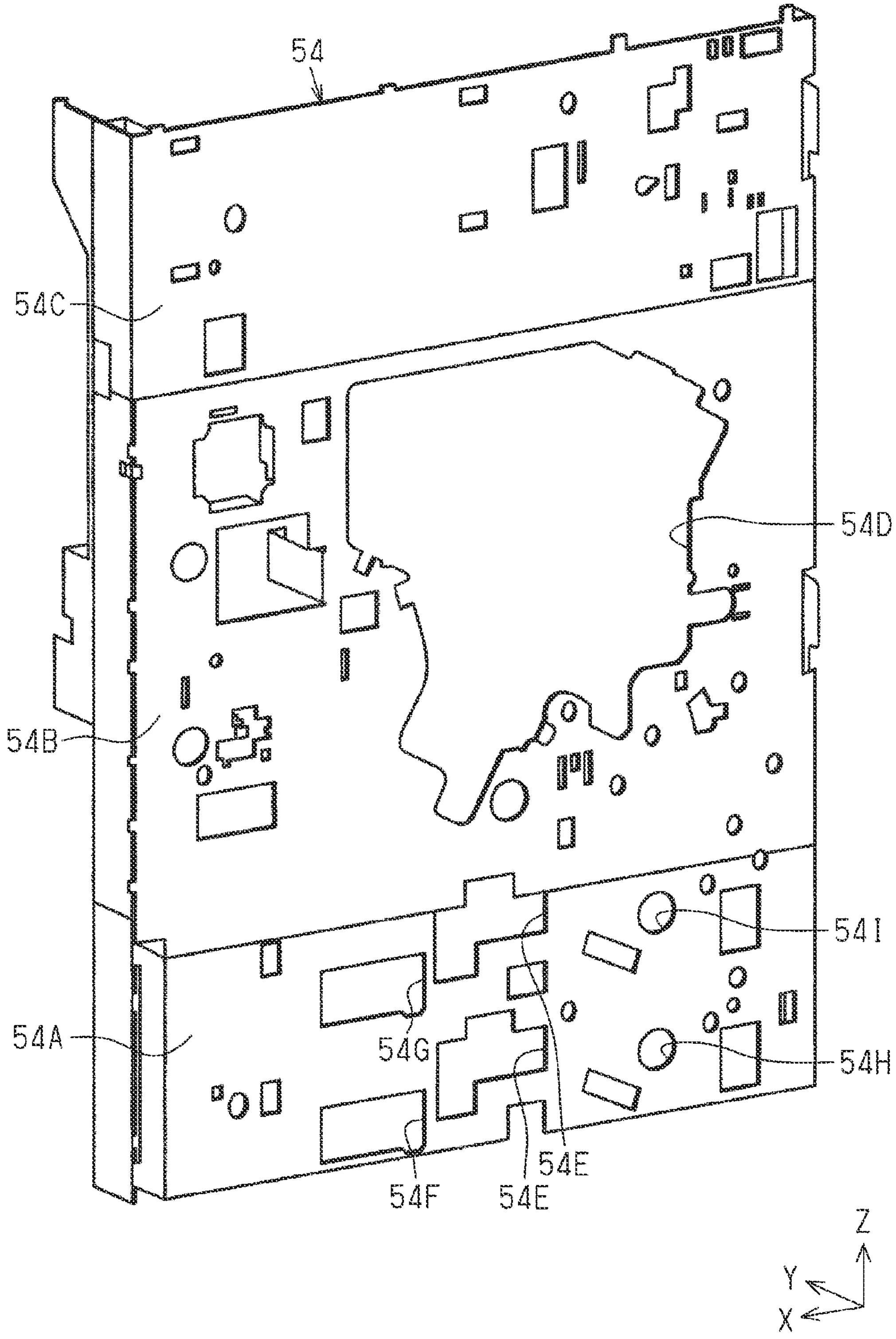
FIG. 7 is a perspective view illustrating a rear frame.

Next, the configurations of the front frame 53 and the rear frame 54 will be described with reference to FIGS. 6 and 7. First, the front frame 53 will be described with reference to FIG. 6. As illustrated in FIG. 6, the front frame 53 has a predetermined shape having a recess portion 53A for opening the ejection space DS toward the front surface 12F (refer to FIG. 1). The front frame 53 is formed with a large number of opening portions for attaching the components of the multifunction machine 11. The front frame 53 includes a large opening portion 53B to which the motion unit 40 is attached, an opening portion 53C to which the mounting section mounted with the liquid supply source 19 is attached, and an opening portion 53D to which the waste liquid storage section 103 is attached. The front frame 53 has an opening portion 53E to which a driving roller 38A (refer to FIG. 17) that configures the ejecting roller pair 38 is attached. By attaching the motion unit 40 to the front frame 53, one end portion of the recording head 45 having the head section 45H in the −Y-axis direction is supported by the first frame 51. The end portion in the +X direction and the end portion in the −X direction of the front frame 53 are respectively bent at substantially right angles in the same direction, and are reinforced by the respective bending shapes.

Next, the rear frame 54 will be described with reference to FIG. 7. The rear frame 54 is configured to include a first sheet metal 54A positioned at the lowest part, a second sheet metal 54B positioned above the first sheet metal 54A, and a third sheet metal 54C positioned above the second sheet metal 54B. The end portion in the +X direction and the end portion in the −X direction are respectively bent at substantially right angles to the rear frame 54 in the same direction, and are reinforced by the respective bending shapes. In the present embodiment, the first sheet metal 54A, the second sheet metal 54B, and the third sheet metal 54C are all made of metal plates having the same plate thickness, and are formed by press working.

The first sheet metal 54A, the second sheet metal 54B, and the third sheet metal 54C are formed with a large number of opening portions for attaching the components of the multifunction machine 11. The above-described motion unit 40 is attached to the largest opening portion 54D formed in the second sheet metal 54B. By assembling the motion unit 40 to the front frame 53, one end portion of the recording head 45 having the head section 45H in the +Y-axis direction is supported by the second frame 52.

In the first sheet metal 54A, an opening portion 54E is an opening portion for attaching a movement control section (not illustrated). When the first-stage cassette 15 and the second-stage cassette 15 are inserted into the apparatus main body 12 and abut against the mounting position, the movement control section acts to cushion the impact and pull each cassette 15 into the mounting position. Opening portions 54F and 54G are opening portions for attaching a size detection section (not illustrated) for detecting the size of the medium accommodated in the first-stage cassette 15 and the second-stage cassette 15 from the lower part.

The opening portion 54H is one of the opening portions for attaching a driving unit (not illustrated) for lifting up a bottom plate (not illustrated) of the first-stage cassette 15. In addition, the opening portion 54I is one of the opening portions for attaching a driving unit (not illustrated) for lifting up a bottom plate (not illustrated) of the second-stage cassette 15. The first sheet metal 54A, the second sheet metal 54B, and the third sheet metal 54C have the same plate thickness. A flat frame surface having almost no step is formed at each joining line between the first sheet metal 54A, the second sheet metal 54B, and the third sheet metal 54C.

Configuration of Motion Unit

Figure 8:
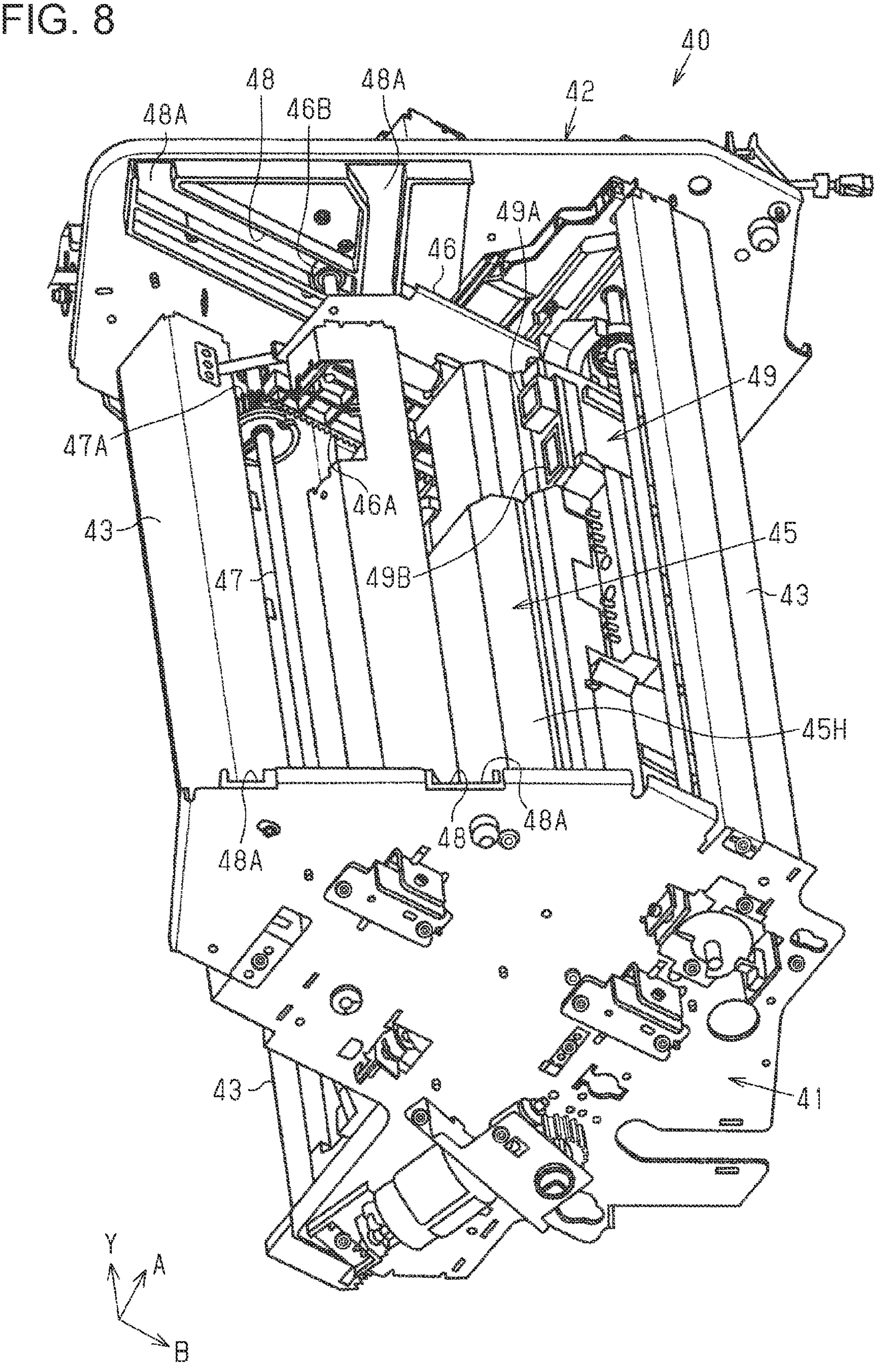
FIG. 8 is a perspective view illustrating a motion unit.

As illustrated in FIG. 8, the motion unit 40 includes the first side frame 41 and the second side frame 42 positioned in the +Y direction with respect to the first side frame 41. The first side frame 41 and the second side frame 42 are formed of a metal plate and form a frame surface along an A-B plane.

The first side frame 41 and the second side frame 42 are coupled by a plurality of coupling frames 43 extending in the Y-axis direction. The plurality of coupling frames 43 are formed by bending a metal plate. In the present embodiment, the plurality of coupling frames 43 are joined to the first side frame 41 and the second side frame 42 by welding. The plurality of coupling frames 43 are bent such that a part or all of the cross section when being cut in the A-B plane is rectangular. Accordingly, the rigidity of the motion unit 40 is improved as a whole.

As illustrated in FIG. 8, the first side frame 41 and the second side frame 42 have a pair of head rails 48 for guiding the recording head 45 on the inner surfaces facing each other. The pair of head rails 48 are fixed to the inner surfaces of the first side frame 41 and the second side frame 42, respectively. The head rail 48 guides the recording head 45 along the B direction. The B direction is a direction having a component in the Z-axis direction. At this point, the head rail 48 guides the recording head 45 in a direction along the Z-axis direction.

The head rail 48 has two rail sections 48A that guide the recording head 45 in the Z-axis direction at the attachment/detachment position PH2 (refer to FIG. 20) to which the recording head 45 has moved in the −B direction along the head rail 48. The first side frame 41 is fixed to the front frame 53 to form the first frame 51, and the second side frame 42 is fixed to the rear frame 54 to form the second frame 52. In this respect, in the present embodiment, the first frame 51 and the second frame 52 have a head rail 48 that guides the recording head 45 along the Z-axis.

The recording head 45 has a pair of support plates 46 (only one side is illustrated in FIG. 8) on both sides in the Y-axis direction. The pair of support plates 46 have a rack 46A that meshes with a pinion 47A fixed to a shaft 47 that rotates forward or rearward by the power of a motor 47M (refer to FIG. 19). A roller 46B is rotatably supported at the tip end portion of a shaft portion that protrudes outward in parallel with the Y-axis from the pair of support plates 46. Two rollers 46B are provided on both sides of the recording head 45 in the Y-axis direction (only one is illustrated in FIG. 8), and two rollers 46B are engaged with the pair of head rails 48 in a rollable state. When the pinion 47A rotates forward, the recording head 45 descends in the +B direction, and when the pinion 47A rotates rearward, the recording head 45 ascends in the −B direction.

The motion unit 40 has the cap carriage 49. The cap carriage 49 is configured to be guided by a cap rail 49R (refer to FIG. 19) and to be capable of reciprocating along the A direction. The cap carriage 49 has a cap 49A and a liquid receiving section 49B (flushing box) on a surface of the recording head 45 facing the head section 45H. Cleaning of the head section 45H is performed by forcibly ejecting a liquid such as ink from the nozzle of the head section 45H in a state where the head section 45H is capped by the cap 49A. By idle-discharging the liquid from the nozzle of the head section 45H toward the liquid receiving section 49B, the thickened liquid in the nozzle is removed and the occurrence of discharge failure is suppressed.

The stop position of the recording head 45 guided in the B direction by the head rail 48 may include an appropriate position as needed, in addition to the recording position PH1 at the time of recording and the attachment/detachment position PH2 at the time of head replacement mode. For example, any one or all of a capping position when capping the recording head 45 with the cap 49A, a wiping position when the wiper carriage wipes the recording head 45, and a temporary retracting position when changing the position of the recording head 45 may be included. As the recording position of the recording head 45, a plurality of recording positions including a first recording position when the medium M is thin paper and a second recording position when the medium M is thick paper may be set.

Attaching Structure of Ejection Tray

Figure 9:
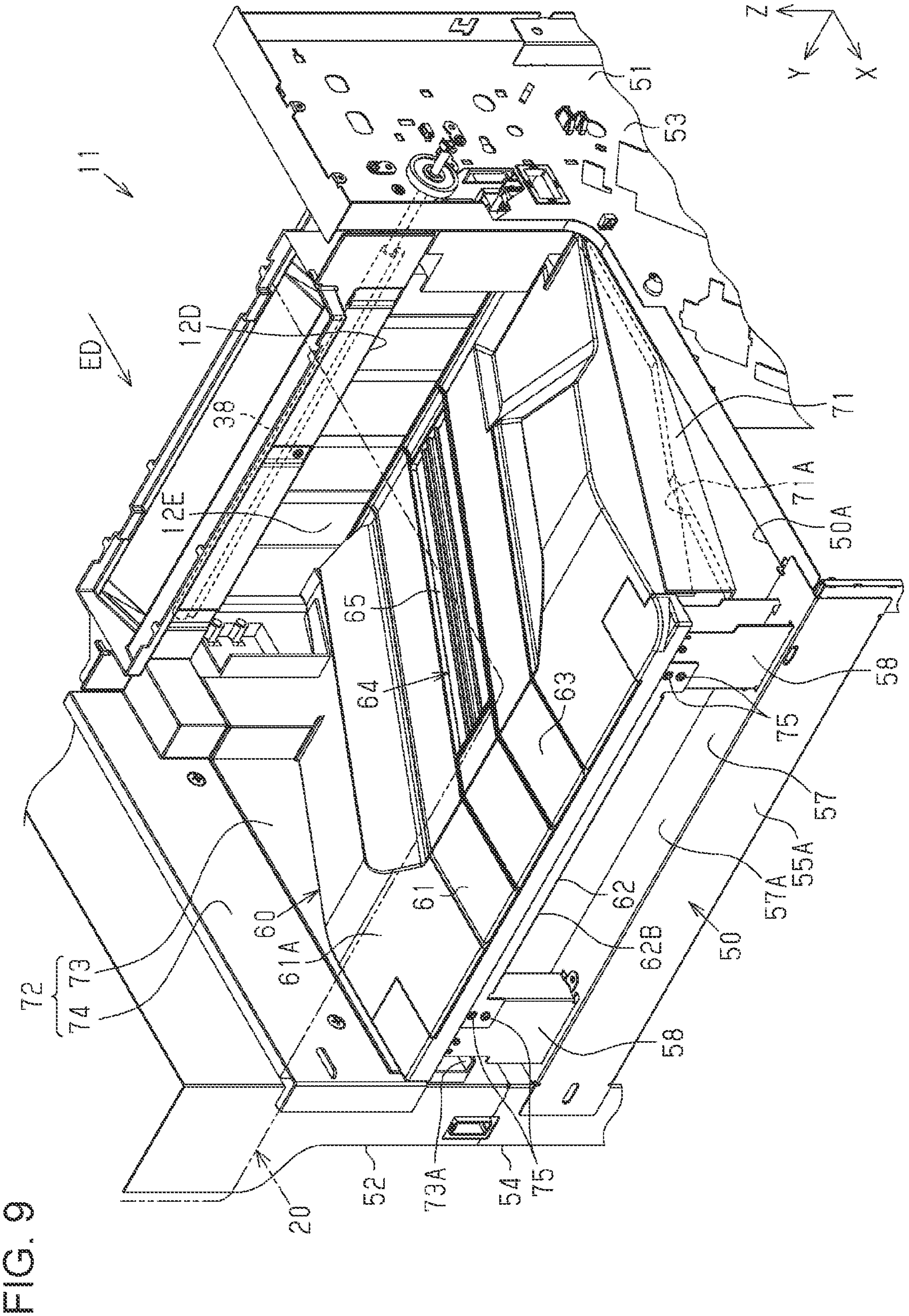
FIG. 9 is a perspective view illustrating the tray unit in a mounted state.

As illustrated in FIG. 9, the ejection tray 61 is fixed to the surface of the stay 58, which is the surface of the main body frame 50 facing a second direction TD, with screws 75. Specifically, a pair of stays 58 are fixed to the placement surface 57A at positions spaced apart from each other in the Y-axis direction with screws. An attaching bracket 62B is provided at the lower portion of the end portion (tip end portion) of the tray unit 60 in the +X direction. The tip end portion of the tray unit 60 is supported at a position higher in the +Z direction than the placement surface 57A by fixing the attaching bracket 62B to the end portions of the pair of stays 58 in the +Z direction with the screws 75. Meanwhile, the upstream end portion of the tray unit 60 in an ejecting direction ED is held at the same height position as the placement surface 57A of the main body frame 50, or at the height position in the −Z direction from the placement surface 57A. The ejection tray 61 is disposed in a posture of being inclined with respect to the horizontal surface to be positioned in the +Z direction as going downstream in the ejecting direction ED.

As illustrated in FIG. 9, a first rail member 71 and a second rail member 72 are attached to the main body frame 50 on both sides sandwiching the ejection space DS in the Y-axis direction. The first rail member 71 is positioned in the −Y direction from the placing region of the tray unit 60, and the second rail member 72 is positioned in the +Y direction from the placing region of the tray unit 60. The first rail member 71 covers the side surface of the tray unit 60 in the −Y direction at a position lower than the upper surface of the tray unit 60. Therefore, the first rail member 71 opens the ejection space DS. The first rail member 71 has a first tray rail 71A that guides the end portion of the bottom portion of the ejection tray 61 in the −Y direction.

Meanwhile, the second rail member 72 is separated into two upper and lower members. In other words, the second rail member 72 is configured with a rail member 73 and a wall member 74. The second rail member 72 blocks the ejection space DS from the +Y direction. In other words, the second rail member 72 forms a surface portion positioned in the +Y direction of the wall surface that divides the ejection space DS. The rail member 73 has a second tray rail 73A. The first tray rail 71A and the second tray rail 73A are formed by substantially the same path in which the paths of the respective rail surfaces overlap each other in the front view seen from the Y-axis direction. The second rail member 72 corresponds to an example of the rail member, and the second tray rail 73A corresponds to an example of the tray rail.

As illustrated in FIG. 9, the tray unit 60 of the present embodiment includes an ascending/descending rib mechanism 64 at the center portion of the width of the loading surface 63 of the ejection tray 61. The ascending/descending rib mechanism 64 has an ascending/descending rib 65 at the center of the width of the loading surface 63 of the ejection tray 61. The ascending/descending rib mechanism 64 is controlled by the control section 100 based on the recording conditions. For example, when the medium M ejected onto the loading surface 63 is recorded under recording conditions that are likely to curl, the control section 100 raises the ascending/descending rib 65, and when the medium M is not recorded, the control section 100 lowers the ascending/descending rib 65.

As illustrated in FIG. 9, the recorded medium M ejected from the ejection port 12D in the ejecting direction ED by the ejecting roller pair 38 is loaded on the loading surface 63 of the ejection tray 61. At this time, the medium M recorded under recording conditions that are easily curled is loaded on the loading surface 63 in a state where the center portion of the width is pushed up by the raised ascending/descending rib 65. Since the loading surface 63 of the ejection tray 61 is inclined to be positioned on the +Z direction as going downstream in the ejecting direction ED, the medium M ejected on the loading surface 63 drops upstream in the ejecting direction ED by its own weight. The rear end of the dropped medium M collides with a standing wall 12E having a surface orthogonal to the X-axis, and accordingly, the positions in the ejecting directions ED are aligned.

When the tray unit 60 illustrated in FIG. 9 is removed from the placement surface 57A of the main body frame 50, the screws 75 are removed to remove the fixing between the attaching bracket 62B and the pair of stays 58. Then, the tray unit 60 is drawn out along the tray rails 71A and 73A in the second direction TD (refer to FIG. 11).

Figure 10:
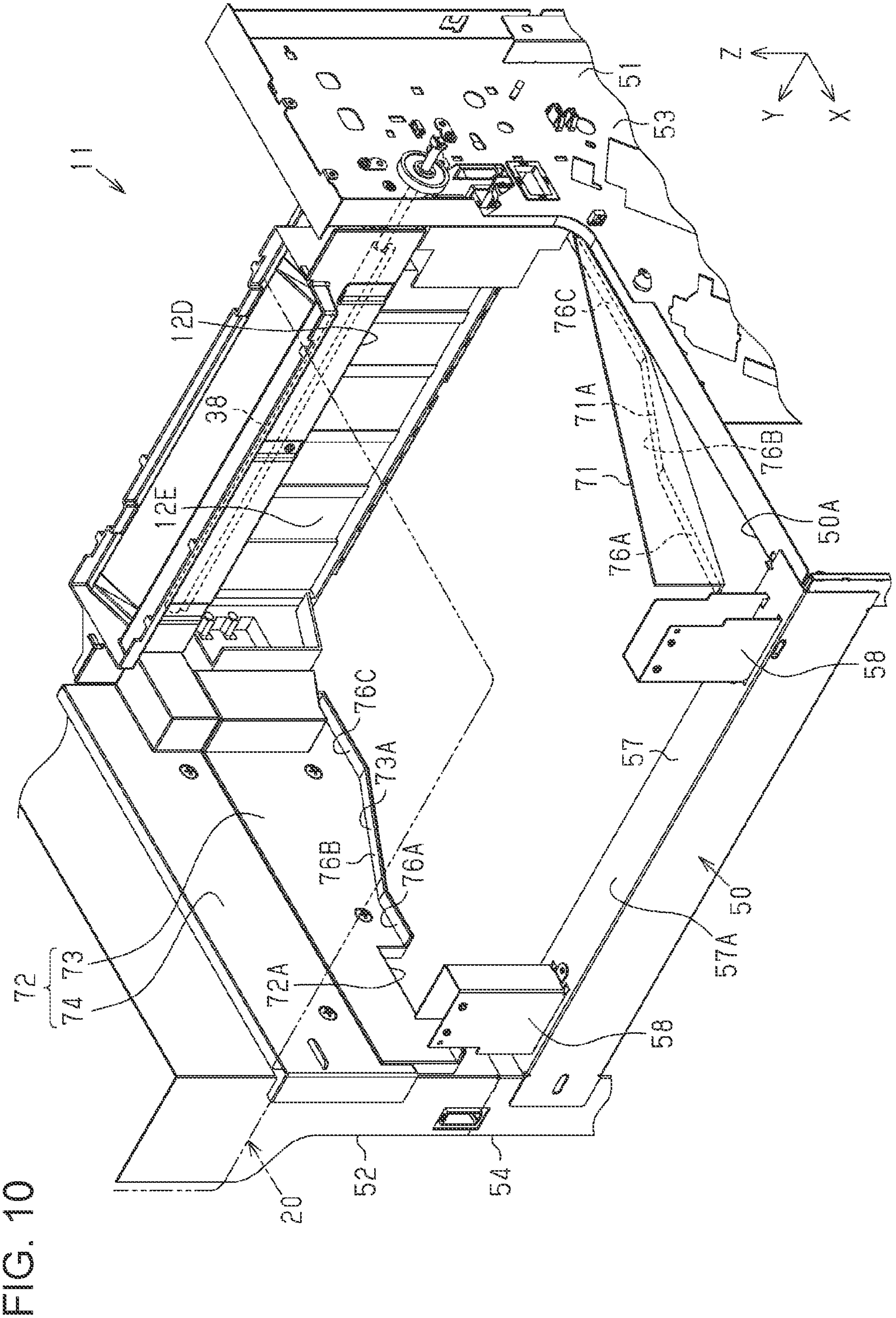
FIG. 10 is a perspective view illustrating a state where the tray unit is removed.

FIG. 10 illustrates a state where the tray unit 60 is removed. As illustrated in FIG. 10, the first and second tray rails 71A and 73A have at least a part that becomes an inclined path that is inclined with respect to the horizontal surface to be positioned in the +Z direction as going downstream in the ejecting direction. The tray unit 60 is guided by the inclined paths of the first and second tray rails 71A and 73A. Accordingly, in the mounted state, as illustrated in FIG. 9, the tray unit 60 is held in a posture of being inclined with respect to the horizontal surface to be positioned in the +Z direction as going downstream in the ejecting direction.

As illustrated in FIG. 10, the first and second tray rails 71A and 73A have a first guide surface 76A extending substantially horizontal to the part near the end portion in the +X direction, an inclined second guide surface 76B, and a substantially horizontal extending third guide surface 76C. The first to third guide surfaces 76A to 76C are arranged in this order along the direction toward the upstream in the ejecting direction. At the lower end portion of the second rail member 72, an opening portion 72A (recess portion) for inserting a connector 69 on the tray unit 60 side is formed in the connector 77 (refer to FIG. 11) on the apparatus main body 12 side, which will be described later. Therefore, the second tray rail 73A is cut at the part of the opening portion 72A, but the cutting length is short, and thus, the guide performance for guiding the tray unit 60 is not affected that much.

Figure 11:
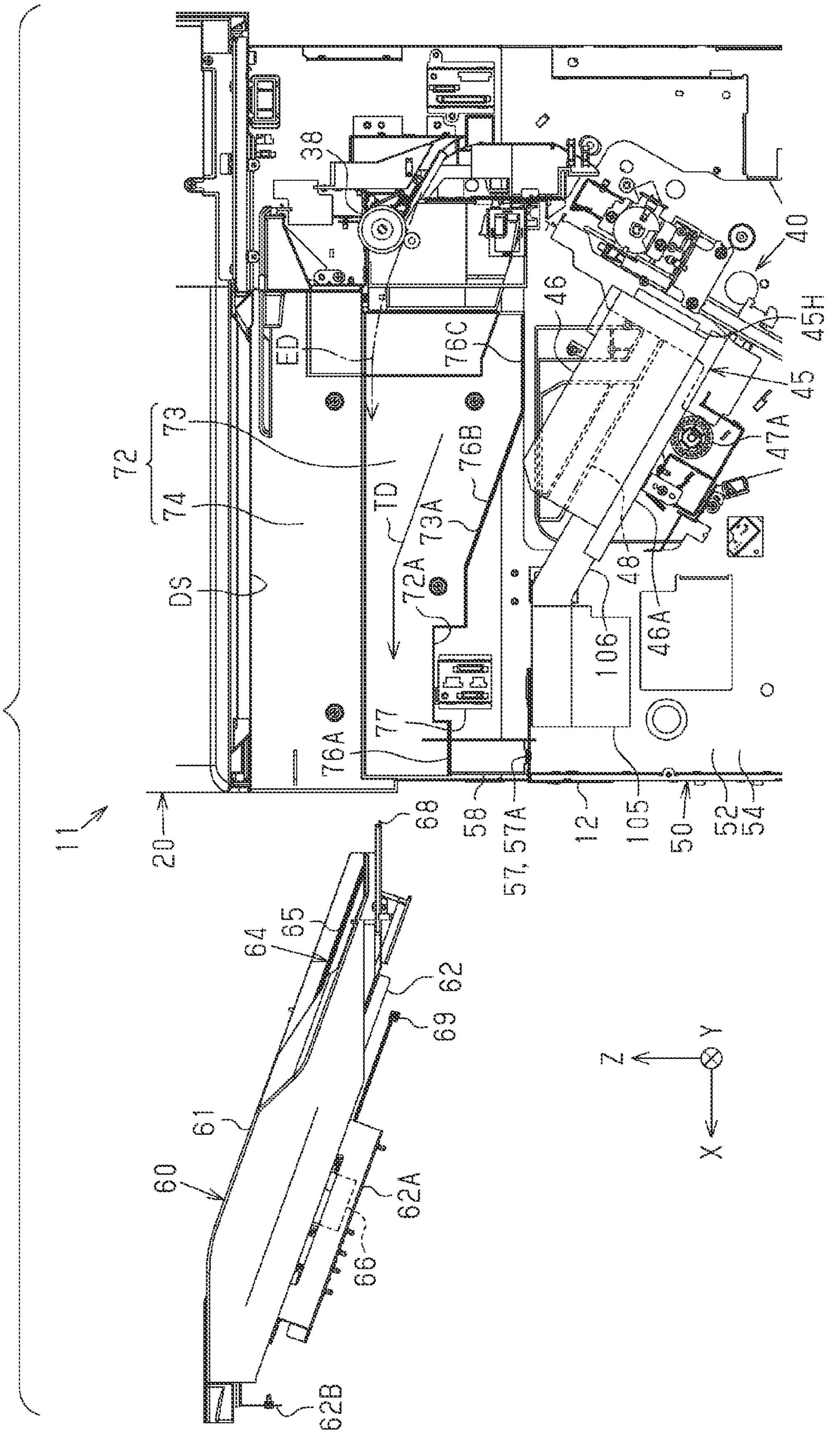
FIG. 11 is a front sectional view of a main part illustrating a state where the tray unit is removed.

As illustrated in FIG. 11, the tray unit 60 is configured to be removed toward the second direction TD, which is the in-plane direction of the first frame 51, by being guided by the first and second tray rails 71A and 73A. The second direction TD moves diagonally upward in the inclined posture in the region guided by the second guide surface 76B in the removal process, and is guided in the horizontal direction in the region guided by the first guide surface 76A. Therefore, although the direction of the second direction TD changes during the removal process, the direction is still the in-plane direction of the first frame 51. In the present example, the second direction TD, which is the removal direction of the tray unit 60, is also the direction along the ejecting direction ED.

As illustrated in FIG. 11, the ejection tray 61 has a fitting section 68 facing the first side in the second direction TD. The first side in the second direction TD indicates upstream of the ejection tray 61 in the take-out direction. In other words, the first side in the second direction TD indicates the downstream in the attaching direction (direction opposite to the second direction TD) when attaching the ejection tray 61. The ejection tray 61 has the fitting section 68 facing the attaching direction at the tip end portion in the attaching direction when being attached to the main body frame 50.

Figure 12:
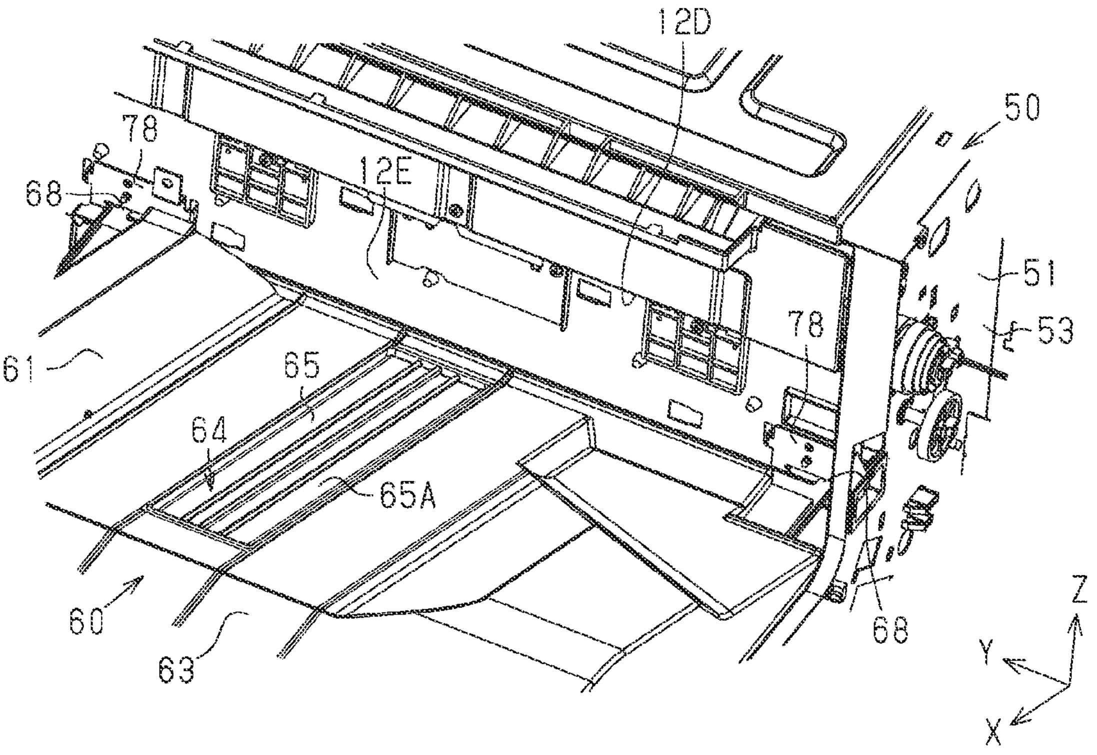
FIG. 12 is a perspective view illustrating a structure for fixing the tray unit to an apparatus main body.

As illustrated in FIG. 12, the ejection tray 61 has the pair of fitting sections 68 facing the first side in the second direction TD at two positions spaced apart from each other in the Y-axis direction. The main body frame 50 has a pair of attaching brackets 78 at positions corresponding to the pair of fitting sections 68 of the ejection tray 61.

Figure 13:
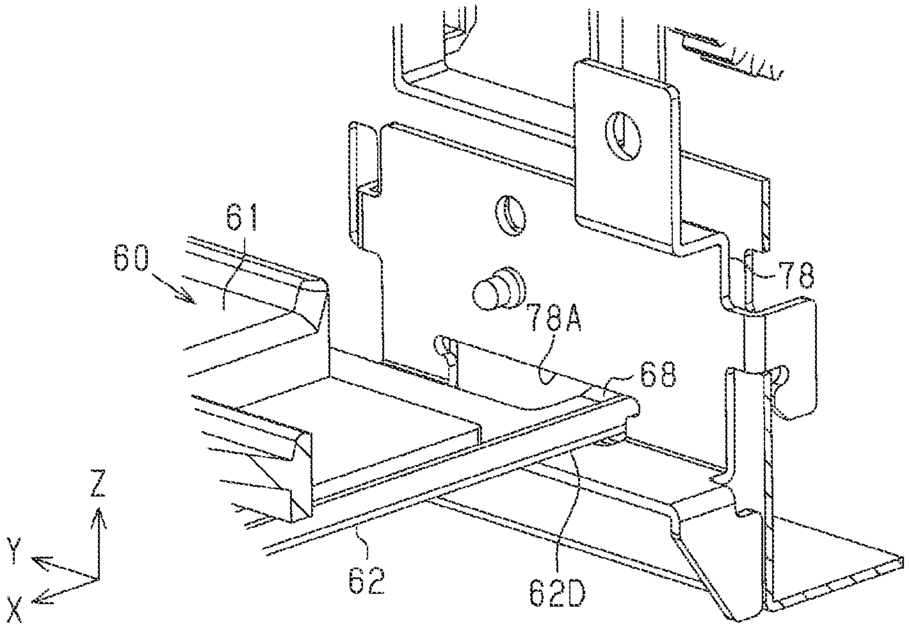
FIG. 13 is an enlarged perspective view illustrating a structure for fixing the tray unit to the apparatus main body.

As illustrated in FIG. 13, the pair of attaching brackets 78 are formed with fitting holes 78A that can be fitted with the fitting section 68. When the pair of fitting sections 68 are fitted into the fitting holes 78A, the ejection tray 61 is positioned in two directions, that is, the Y-axis direction (depth direction Y) and the Z-axis direction (vertical direction Z) with respect to the main body frame 50.

Configuration of Tray Unit

Next, a detailed configuration of the tray unit 60 will be described with reference to FIGS. 14 to 16.

Figure 14:
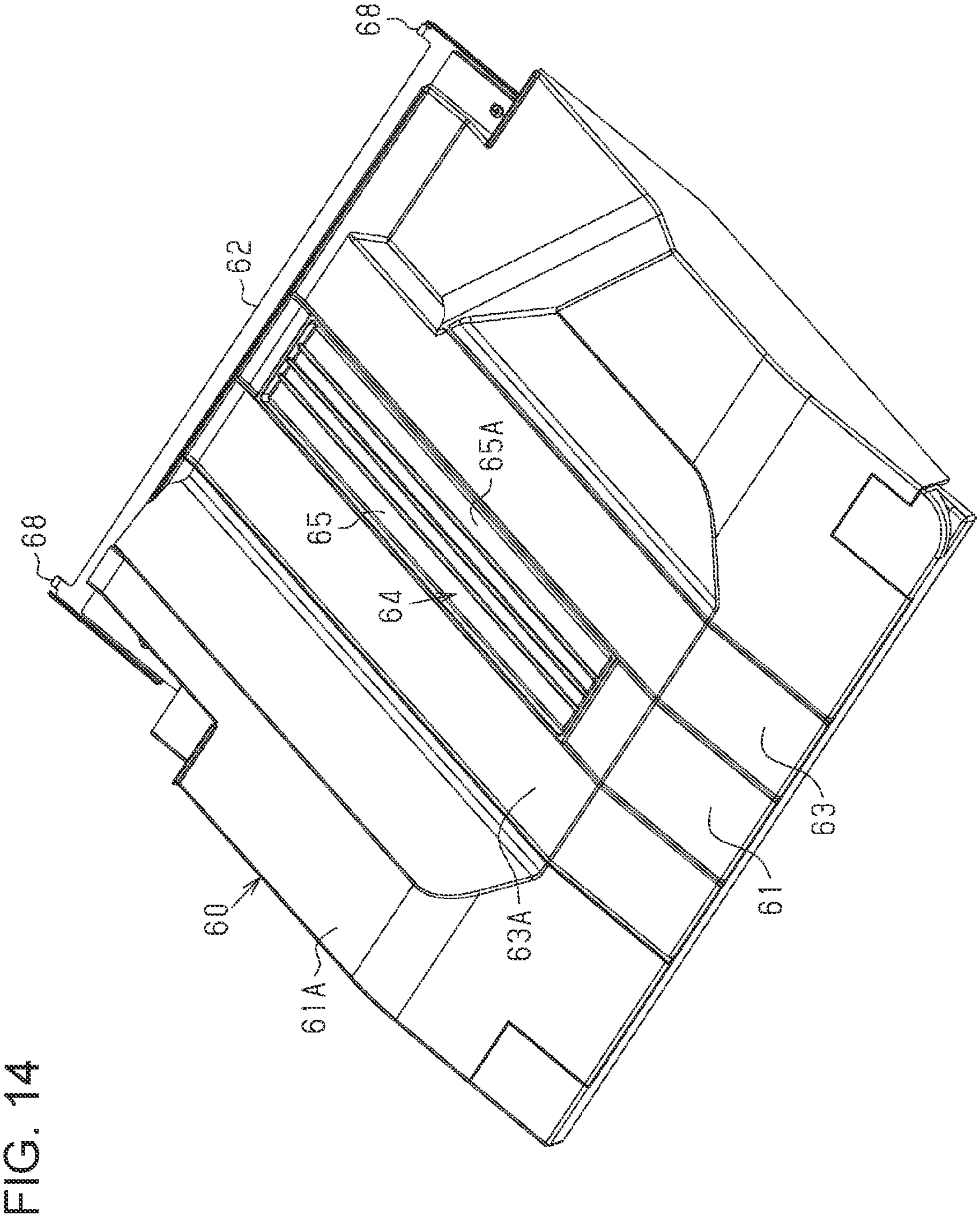
FIG. 14 is a perspective view illustrating the tray unit.
Figure 15:
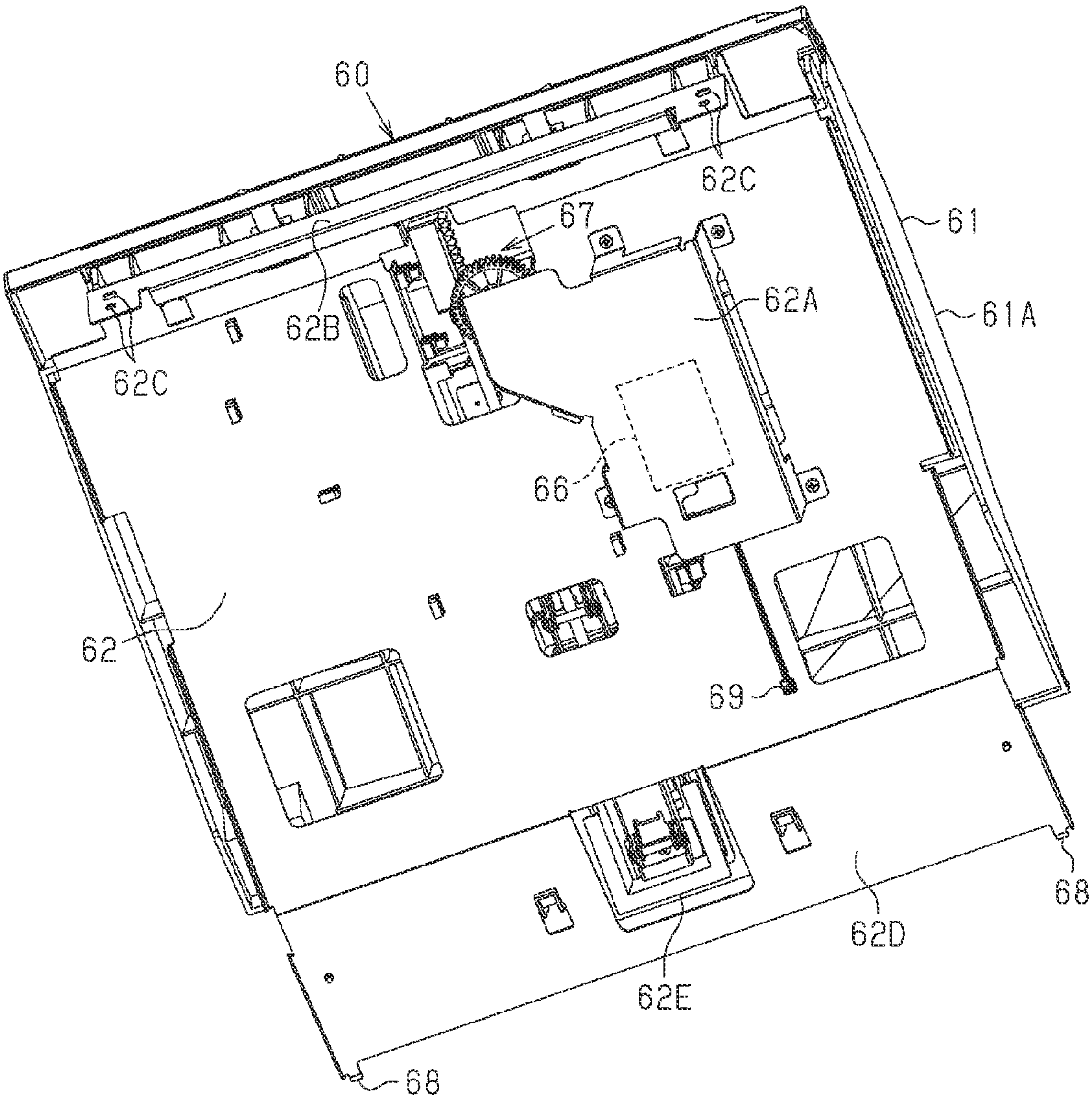
FIG. 15 is a perspective view illustrating a back surface of the tray unit.
Figure 16:
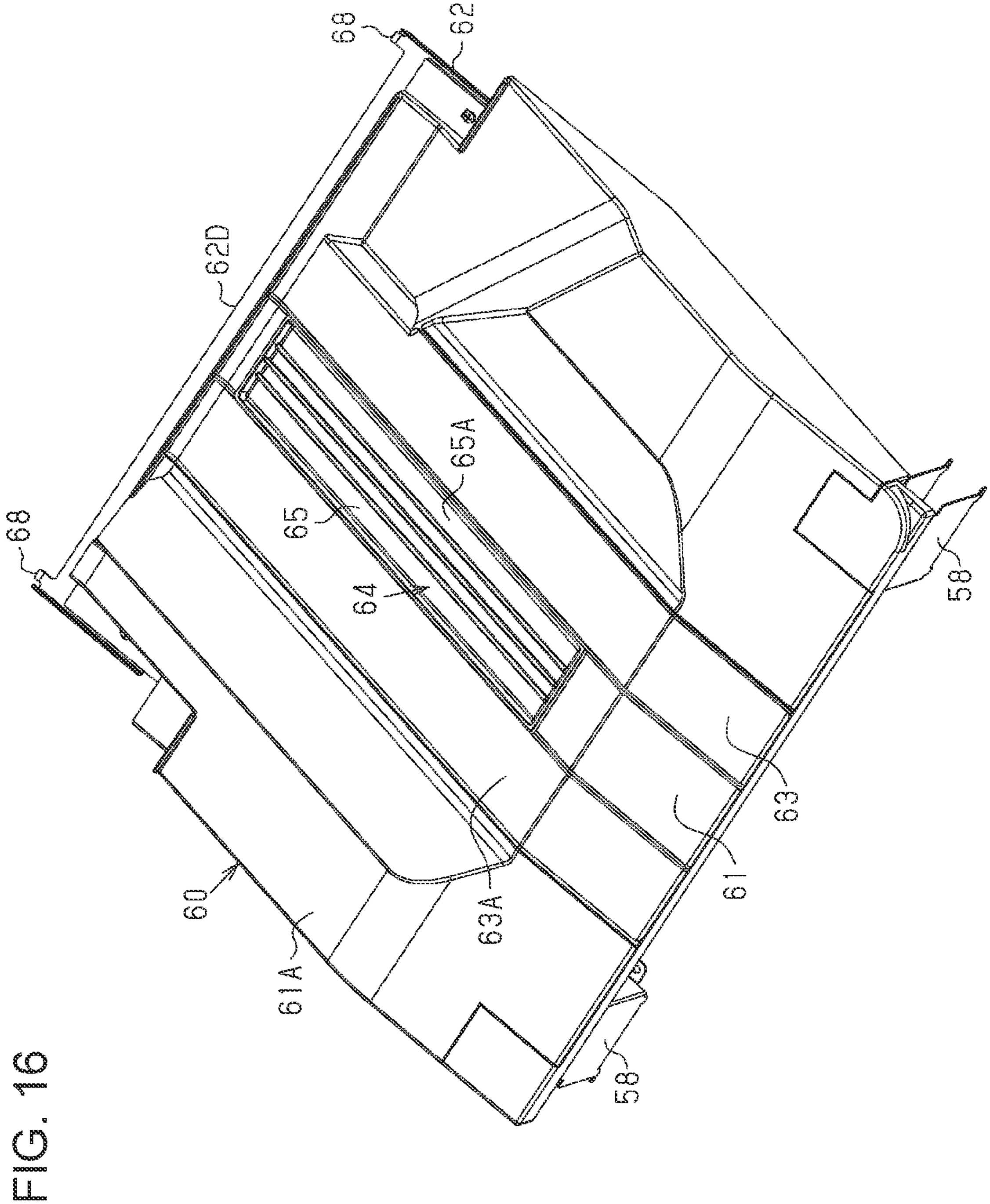
FIG. 16 is a perspective view illustrating the tray unit with a stay.

FIG. 14 illustrates the front surface of the tray unit 60, and FIG. 15 illustrates the back surface of the tray unit 60. As illustrated in FIG. 14, the tray unit 60 has the ejection tray 61 having a function of loading the medium M, and the ascending/descending rib mechanism 64 assembled to the ejection tray 61. The ascending/descending rib mechanism 64 has the long ascending/descending rib 65 extending along the ejecting direction at the center portion of the loading surface 63 in the width direction orthogonal to the ejecting direction of the medium M so as to be capable of ascending and descending with respect to the loading surface 63.

The loading surface 63 of the ejection tray 61 has a first surface 63A that supports the laminated medium M, and a second surface 65A which is a surface that supports the laminated medium M, and a surface of which a protrusion amount with respect to the first surface 63A can be changed by driving from the driving source 66 (refer to FIG. 15). In other words, in the tray unit 60, the surface region other than the ascending/descending rib 65 on the loading surface 63 is the first surface 63A, and the upper surface of the ascending/descending rib 65 on the loading surface 63 is the second surface 65A.

The ascending/descending rib 65 ascends and descends between a descending position (retracting position) at which the protrusion amount with respect to the first surface 63A is a first protrusion amount, and an ascending position at which the protrusion amount with respect to the first surface 63A is a second protrusion amount larger than the first protrusion amount. The protrusion amount of the ascending/descending rib 65 with respect to the first surface 63A may be configured to be adjusted to an intermediate protrusion amount between the descending position and the ascending position. The second surface 65A, which is the upper surface of the ascending/descending rib 65, is disposed at a height position corresponding to the protrusion amount of the ascending/descending rib 65 with respect to the first surface 63A. When the ascending/descending rib 65 is at the descending position, the second surface 65A is disposed at the first height which is the same height or lower than the first surface 63A. When the ascending/descending rib 65 is at the ascending position, the second surface 65A is disposed at a second height higher than the first height with respect to the first surface 63A. When the ascending/descending rib 65 is configured to be capable of ascending and descending to different heights of three or more steps, the second surface 65A may be disposed at a third height of one or more steps, which is the height between the first height and the second height. The first height of the second surface 65A may be higher than that of the first surface 63A.

The entire member of the ejection tray 61 having the loading surface 63 on the front surface is made of synthetic resin. The ascending/descending rib 65 assembled to the ejection tray 61 is made of synthetic resin. The ejection tray 61 has a tray section 61A made of synthetic resin on the loading surface 63 side, and a metal plate 62 made of sheet metal that covers almost the entire back surface of the tray section 61A illustrated in FIG. 15.

As illustrated in FIG. 15, the plate 62 that substantially covers the back surface of the ejection tray 61 has a cover 62A that protrudes toward the back surface side as a part thereof. The cover 62A is in a state of covering the driving source 66 such as a motor that outputs a driving force to the ascending/descending rib mechanism 64. The driving system components including the driving source 66 are protected by the cover 62A. In the region corresponding to the ascending/descending rib 65 on the back surface of the ejection tray 61, an ascending/descending mechanism 67 for ascending and descending the ascending/descending rib 65 is assembled in a built-in state. For example, when the driving source 66 is driven rotating forwardly, the ascending/descending rib 65 ascends via the ascending/descending mechanism 67. In addition, when the driving source 66 is driven rotating rearwardly, the ascending/descending rib 65 descends via the ascending/descending mechanism 67. In this manner, the control section 100 controls the driving source 66 to control the protrusion amount of the ascending/descending rib 65.

As illustrated in FIG. 15, the attaching bracket 62B is formed at the tip end portion of the plate 62 by bending. The attaching bracket 62B has screw insertion holes 62C on both sides spaced apart from each other corresponding to the interval between the pair of stays 58. The plate 62 has an extension plate section 62D which is inclined toward the front surface side at the rear end portion and extends across a predetermined length as going upstream (rear end side) in the ejecting direction ED. The pair of fitting sections 68 extend upstream in the ejecting direction from both ends of the extension plate section 62D in the width direction. The direction in which these pair of fitting sections 68 face is the first side in the second direction TD. A wiring coupled to the driving source 66 extends from the cover 62A, and the connector 69 is coupled to the tip end portion of the wiring. The connector 69 is coupled to the connector 77 (refer to FIG. 11) on the main body frame 50 side when the tray unit 60 is mounted on the main body frame 50.

Characteristics of Attaching Structure of Tray Unit

Next, a characteristic configuration when the tray unit 60 is in a mounted state on the main body frame 50 will be described.

Figure 17:
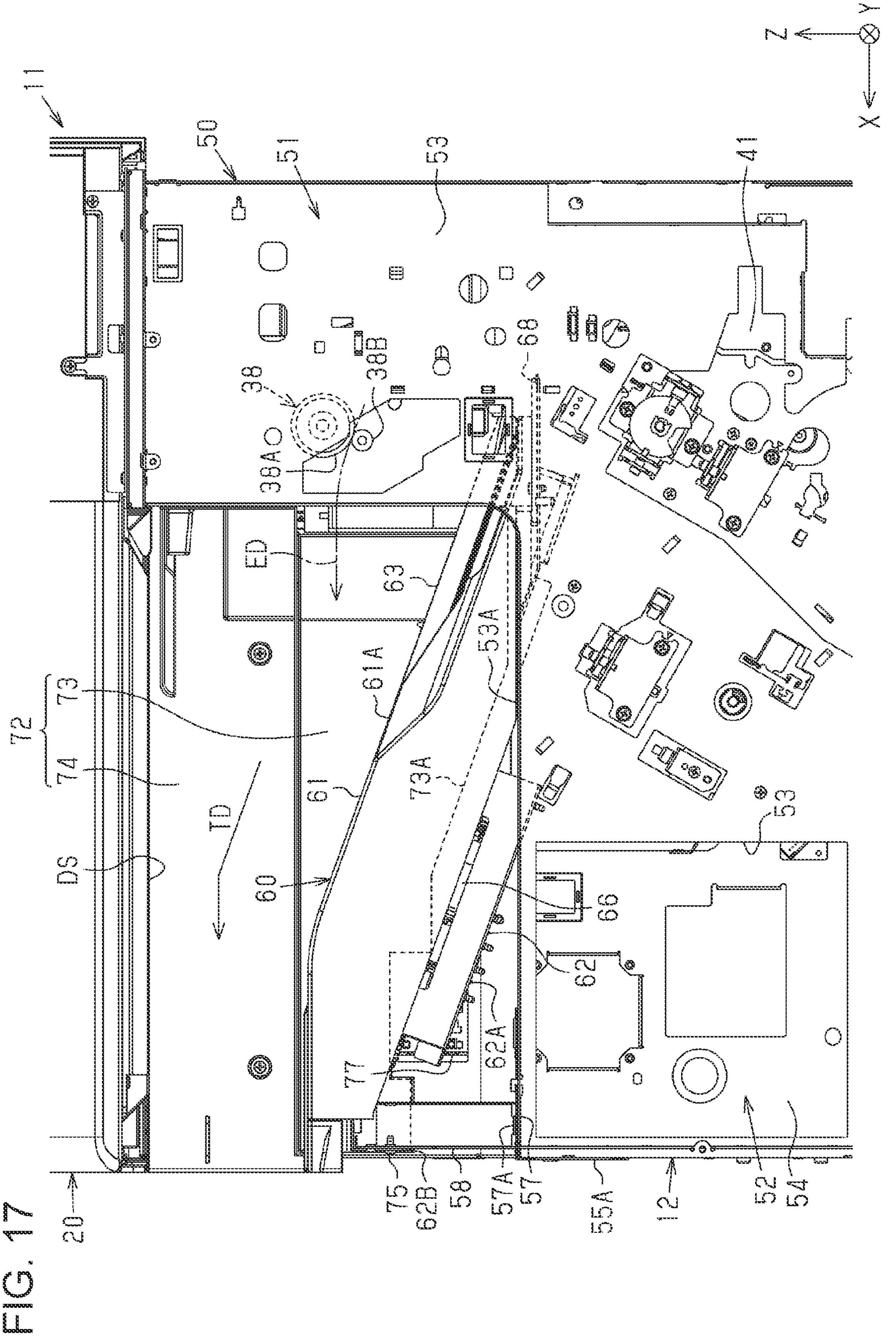
FIG. 17 is a front view illustrating a main part of the multifunction machine.

As illustrated in FIG. 17, a part of the ejection tray 61 is located between the first frame 51 and the second frame 52.

In the example illustrated in FIG. 17, a part of the ejection tray 61 on upstream in the ejecting direction ED is positioned between the first frame 51 and the second frame 52. Specifically, the end portion of the ejection tray 61 on upstream in the ejecting direction ED is positioned between the front frame 53 and the rear frame 54. The lower end portion of the cover 62A that covers the driving source 66 on the back surface of the ejection tray 61 is also positioned between the front frame 53 and the rear frame 54. The ejecting roller pair 38 is configured with a driving roller 38A and a driven roller 38B.

Figure 18:
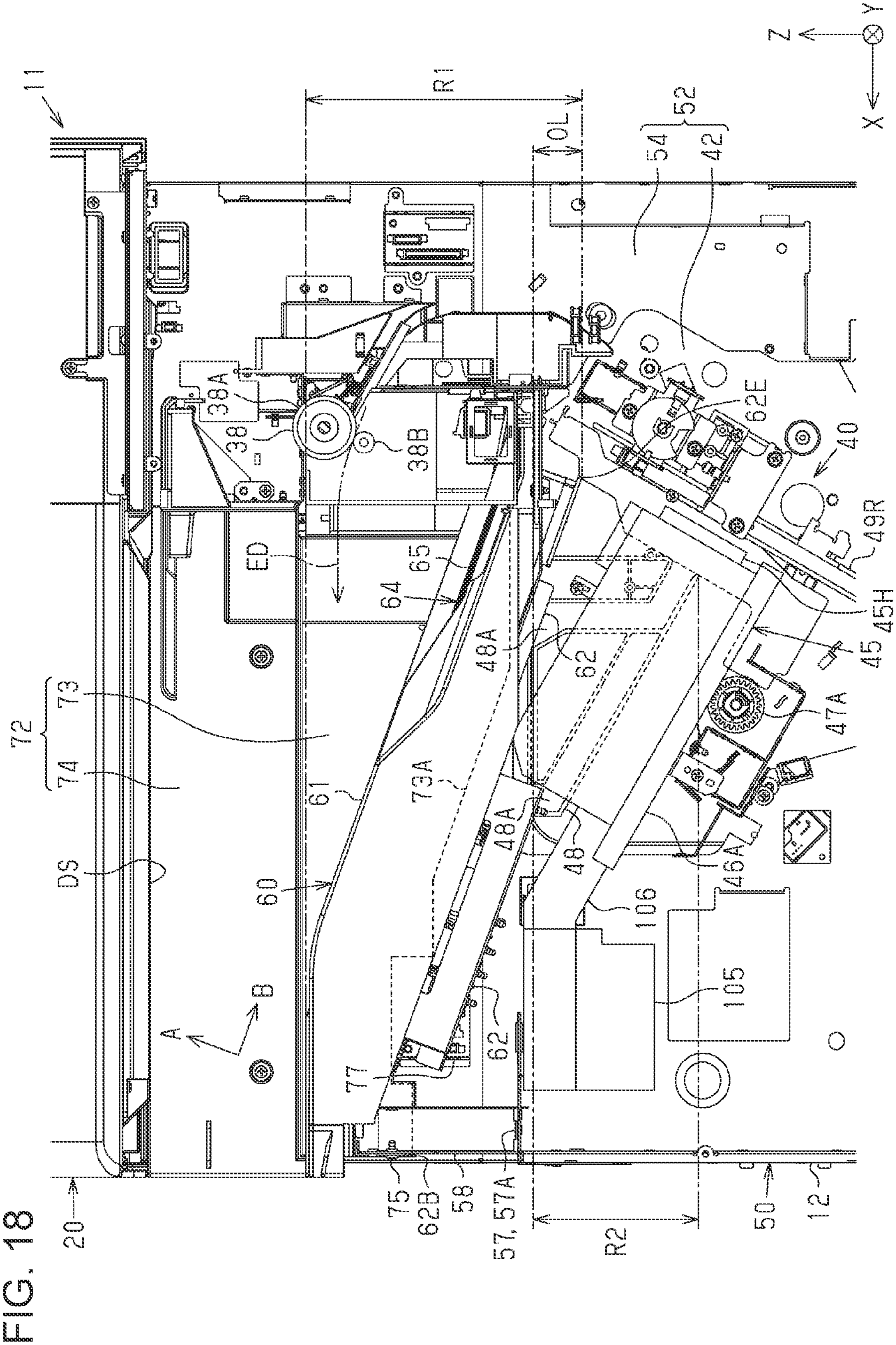
FIG. 18 is a front sectional view illustrating a main part of the multifunction machine.

As illustrated in FIG. 18, the recording head 45 has a rack 46A. The rack 46A meshes with the pinion 47A. When the pinion 47A rotates forward or rearward by the power of the motor 47M (refer to FIG. 19), the recording head 45 is guided by the head rail 48 and descends in the +B direction or ascends in the −B direction.

The ejection tray 61 covers the head rail 48. The opening 50A in the placing region of the tray unit 60 is an outlet of the recording head 45. The head rail 48 is disposed on the first path that can guide the recording head 45 toward the opening 50A, which is the outlet, and the second path that can move the recording head 45 to the +Z direction along the Z-axis at the attachment/detachment position PH2 (refer to FIG. 20). In other words, the head rail 48 has a main rail part extending along the B direction to form the first path, and the plurality of rail sections 48A branching from this rail part and extending along the Z-axis to form the second path toward the opening 50A, which is an outlet. Therefore, the ejection tray 61 that covers the opening 50A is in a state of covering the head rail 48.

As illustrated in FIG. 18, the ejection tray 61 is inclined toward the +Z direction as going downstream in the ejecting direction ED. In the tray unit 60, the downstream end portion (tip end portion) in the ejecting direction ED is supported at the position above the placement surface 57A via the pair of stays 58 fixed onto the placement surface 57A. The tray rail 71A (refer to FIG. 12) and the tray rail 73A are inclined toward the +Z direction as going downstream in the ejecting direction ED. Accordingly, the ejection tray 61 supported by the stay 58 and placed on the placement surface 57A in a state of being guided by the tray rails 71A and 73A is inclined toward the +Z direction as going downstream in the ejecting direction ED.

On the lower side of the ejection tray 61, a fan unit 105 attached to the opening portion 53C (refer to FIG. 6) of the first frame 51, and a duct 106 which is a passage for cooling air to be blown from the fan unit 105 to the recording head 45 are arranged. In the example illustrated in FIG. 18, the fan unit 105 and the duct 106 do not protrude upward from the opening surfaces of the placement surface 57A and the opening 50A.

Figure 20:
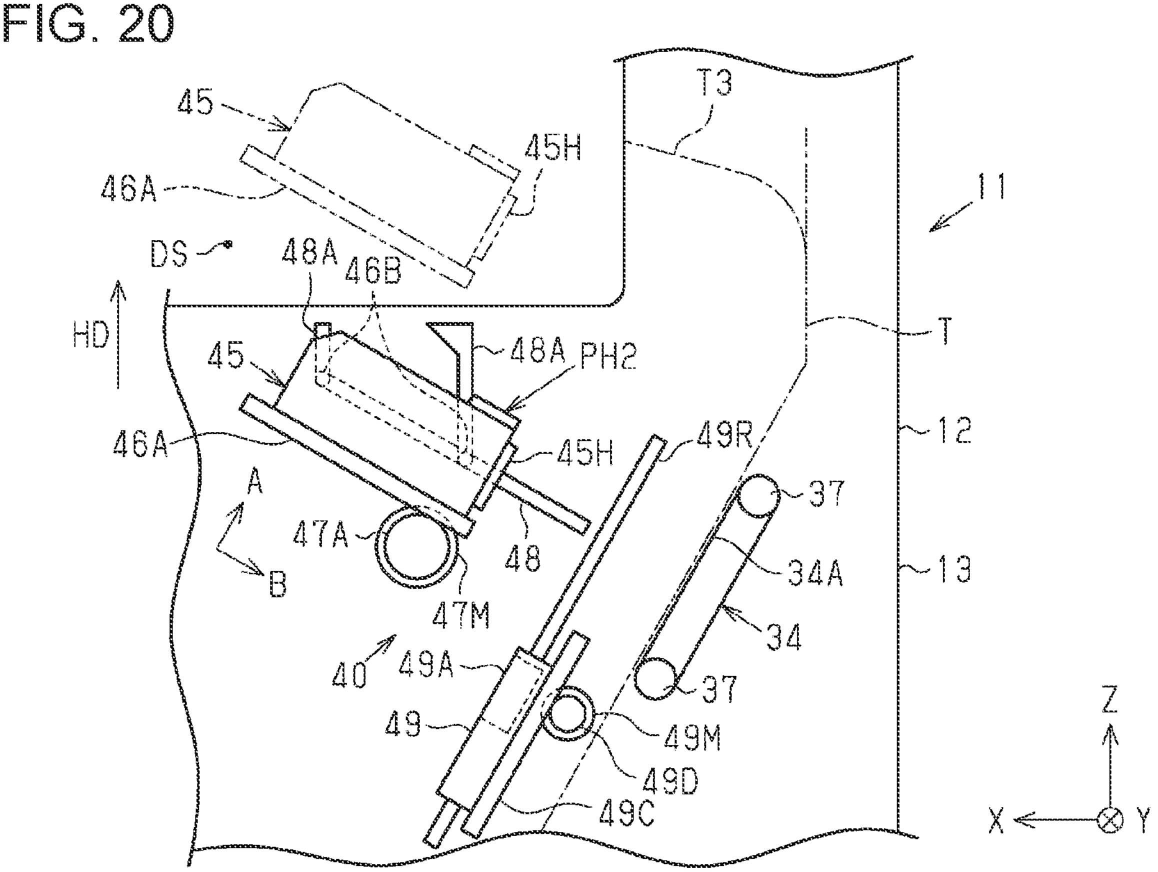
FIG. 20 is a schematic side view illustrating the recording head which is at a removal position.

The recording head 45 illustrated in FIG. 18 is positioned slightly on the +B direction side of the attachment/detachment position PH2 (refer to FIG. 20). The position where the recording head 45 slightly ascends in the −B direction from the position illustrated in FIG. 18 is the attachment/detachment position PH2. Accordingly, the recording head 45 positioned at the attachment/detachment position PH2 is in a state of partially protruding upward from the opening 50A which is the outlet thereof.

Components and members may be arranged in the space below the ejection tray 61. For example, an ink tube or a head duct may be arranged in the space below the ejection tray 61. The tube for supplying a liquid such as ink from the liquid supply source 19 to the recording head 45 is piped on the path along the head rail 48. A part of this tube may be disposed in the space below the ejection tray 61. A part of the duct 106, which is a passage for cooling air to be blown from the fan unit 105 to the recording head 45, may be disposed in the space below the ejection tray 61. A part of the fan unit 105 may be disposed in the space below the ejection tray 61. The space below the ejection tray 61 as used herein indicates a space that can be on the +Z direction of the opening surface of the opening 50A or the placement surface 57A (horizontal surface) and on the −Z direction of the ejection tray 61 because the ejection tray 61 is in an inclined posture to be positioned on the +Z direction as going downstream in the ejecting direction.

As illustrated in FIG. 18, in a state where the ejection tray 61 covers the head rail 48, a range R1 occupied by the ejection tray 61 in the Z-axis direction partially overlaps with a range R2 occupied by the head rail 48 in the Z-axis direction. Here, the range R1 is a range in the Z-axis direction from the upper end surface of the loading surface 63 of the ejection tray 61 to a lower end portion 62E (refer to also FIG. 15) of the part extending downward from the plate 62. The range R2 is a range from the upper end of the removable rail section 48A of the head rail 48 to the lower end of the head rail 48. As illustrated in FIG. 18, the range R1 and the range R2 overlap in a range OL in the Z-axis direction. The range R1 is equal to the range occupied by the tray unit 60 including the ejection tray 61 and the ascending/descending rib mechanism 64 in the Z-axis direction.

As illustrated in FIGS. 9 and 18, the tray rails 71A and 73A guide the ejection tray 61 toward the +Z direction as going downstream in the ejecting direction ED. Specifically, as illustrated in FIG. 10, the tray rails 71A and 73A have the second guide surface 76B which is an inclined surface for guiding the ejection tray 61 toward the +Z direction, and the first guide surface 76A which is a horizontal surface for guiding the ejection tray 61 in the X-axis direction, as going downstream in the ejecting direction ED. The second guide surface 76B, which is an inclined surface of each of the tray rails 71A and 73A, guides the ejection tray 61 toward the +Z direction as going downstream in the ejecting direction ED. The first guide surface 76A of each of the tray rails 71A and 73A is provided for holding such that the ejection tray 61, which is guided diagonally upward by the second guide surface 76B of the tray rails 71A and 73A and is removed halfway, does not drop back to the original position along the second guide surface 76B which is an inclined surface by its own weight. In other words, the first guide surface 76A formed of the horizontal surfaces of the tray rails 71A and 73A has a function of preventing the ejection tray 61 removed halfway along the tray rails 71A and 73A from dropping to the original position.

The first guide surface 76A is sufficient as long as the surface is a substantially horizontal surface, and may be tilted at a smaller angle of, for example, 10° or less than the horizontal surface. In short, the angle formed by the first guide surface 76A with respect to the horizontal is a smaller angle (including 0°) than the inclination angle of the second guide surface 76B, and may be any angle that can suppress the drop in which descending occurs along the second guide surface 76B at its own weight.

As illustrated in FIG. 17, the ejection tray 61 is configured to be removed toward the second direction TD, which is the in-plane direction of the first frame 51, in a state where the scanner 20 is fixed to the main body frame 50. The tray unit 60 is removed as illustrated in FIG. 11 by being guided by the front tray rail 71A and the rear tray rail 73A along the path indicated by the solid arrow in FIG. 11. Here, the second direction TD indicated by the arrow in FIG. 11 is the in-plane direction of the first frame 51. As illustrated in FIG. 11, the second direction TD is not limited to one of the in-plane directions of the first frame 51, may be a combination of a plurality of directions, and may be a direction that changes continuously depending on the position of the ejection tray 61 on the removal path.

As illustrated in FIGS. 9, 10, and 17, the rail members 71 and 72 (73) having the tray rails 71A and 73A form the ejection space DS. The tray rail 73A that guides the ejection tray 61 along the second direction TD is fixed to the second frame 52.

As illustrated in FIG. 17, the main body frame 50 has the fitting hole 78A as an example of a fitted section facing the second side of the second direction TD. The fitting restricts the movement of the ejection tray with respect to the main body frame 50 in the direction intersecting the second direction. The direction intersecting the second direction may be at least one direction. By moving the ejection tray 61 with respect to the main body frame 50 along the second direction TD, the fitting between the fitting section 68 and the fitting hole 78A is released.

Figure 19:
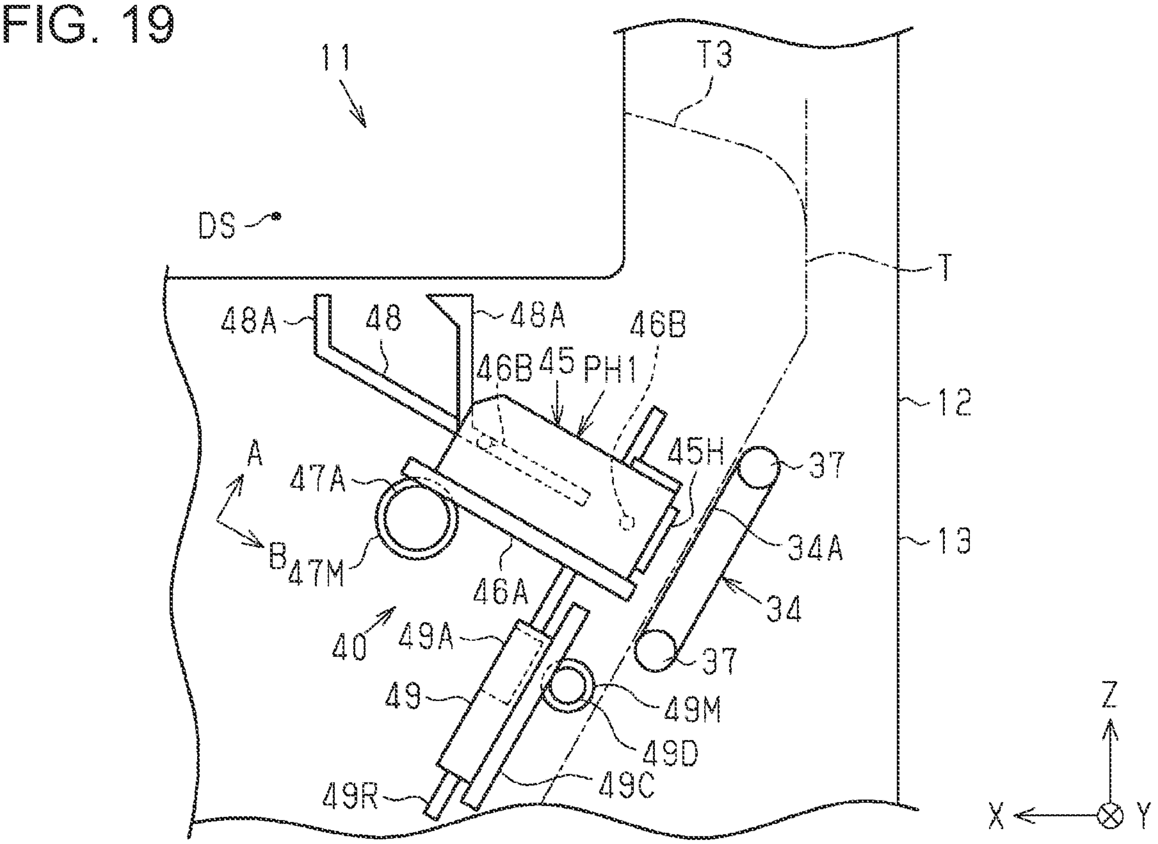
FIG. 19 is a schematic side view illustrating a recording head which is at a recording position.

As illustrated in FIG. 19, the recording head 45 is disposed at the recording position PH1 during recording. During non-recording, the recording head 45 is disposed at a standby position moved in the −B direction from the recording position PH1. At the standby position, the cap carriage 49 is at a position where the recording head 45 and the cap 49A face each other in the B direction, and the head section 45H of the recording head 45 is capped by the cap 49A. When replacing the recording head 45, the tray unit 60 is removed as illustrated in FIGS. 19 and 20. Then, the user selects the head replacement mode and performs the head take-out instruction by operating the operation section 14 or operating the host device coupled to the multifunction machine 11. The control section 100 that has received the head take-out instruction drives the motor 47M to move the recording head 45 to the attachment/detachment position PH2 illustrated in FIG. 20. In the attachment/detachment position PH2, the recording head 45 is disposed at a position in the vicinity facing the opening 50A. The user removes the recording head 45 from the opening 50A. As described above, the recording head 45 of the present embodiment is configured to be removed toward the third direction HD, which is the in-plane direction HD of the first frame 51, in a state where the scanner 20 is fixed to the main body frame 50 after the ejection tray 61 is removed. Here, the third direction HD is a direction in which the recording head 45 is guided along the rail section 48A of the head rail 48, and is a direction along the Z-axis. Since the pair of head rails 48 are respectively fixed to the surface of the first frame 51 and the surface of the second frame 52 parallel to the first frame 51, the third direction HD is the in-plane direction of the first frame 51, and is a direction along the Z-axis.

As illustrated in FIG. 19, the cap rail 49R that guides the cap carriage 49 in a reciprocating direction in the A direction extends along the A direction. A rack 49C included in the cap carriage 49 meshes with a pinion 49D rotated by a motor 49M. When the control section 100 drives and controls the motor 49M, the cap carriage 49 moves to a plurality of positions including the retracting position (illustrated in FIG. 19) retracted from the position facing the recording head 45 in the B direction, and the cap position when the cap 49A caps head section 45H.

Action of Embodiment

The action of the multifunction machine 11 of the present embodiment will be described.

Action of Tray Unit

The user performs recording or copying using the multifunction machine 11 in which the ejection tray unit is mounted. When performing recording on the medium M, the recorded data is sent from the host device operated by the user to the control section 100 of the multifunction machine 11. When performing copying, the image data obtained by the scanner 20 reading the document D set on the document tray 24 or the document holder 21 by the user is sent to the control section 100.

The control section 100 that has received the instruction performs recording control for recording the recorded data or an image based on the image data on the medium M. The control section 100 first feeds the medium M from the cassette 15. The fed medium M is transported along the transport path T by the transport mechanism 30. The recording head 45 records characters or images on the medium M by discharging a liquid such as ink toward the medium M. The recorded medium M is ejected from the ejection port 12D to the ejection space DS by the ejecting roller pair 38, through the transport path T3. The ejected medium M is loaded on the loading surface 63 of the ejection tray 61.

The control section 100 controls the ascending and descending of the ascending/descending rib 65 by driving and controlling the driving source 66. Specifically, the control section 100 controls the ascending/descending rib 65 based on the recording condition data. The recording condition data is data related to recording conditions selected by the user when instructing recording (including copying) by operating the operation panel or by a host device (not illustrated). The host device is, for example, a personal computer, and a printer driver (software) is installed. The printer driver displays the setting screen on the display section of the host device. The user operates a pointing device such as a mouse on the setting screen to set recording conditions. The recording conditions of the recording mode include a plurality of recording condition items such as a medium type, size, recording quality mode, and recording color (color/monochrome and the like). In addition, the recording conditions of the copy mode include a plurality of recording condition items such as a medium type, size, recording quality mode, and recording color (color/monochrome and the like).

The control section 100 raises the ascending/descending rib 65 when the recording condition in which curl of the medium M is likely to occur is set as a result of the determination based on the recording condition information included in the recorded data. Specifically, when the parameter that indicates the likelihood of curling exceeds the threshold value, the control section 100 drives the driving source 66 to raise the ascending/descending rib 65. As a parameter indicating the likelihood of curling, for example, the liquid discharge amount per unit area with respect to the medium M can be described. By controlling the ascending/descending rib 65 in this manner, curling of the medium M after recording loaded on the ejection tray 61 is suppressed.

Maintenance Method for Multifunction Machine

Figure 21:
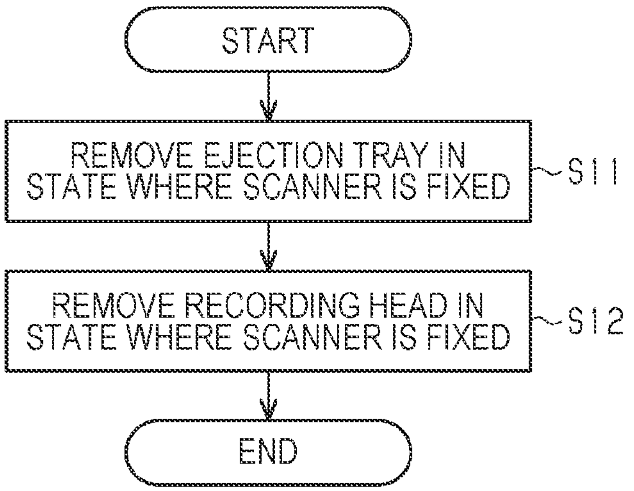
FIG. 21 is a flowchart illustrating a maintenance method of the multifunction machine.

Next, a maintenance method of the multifunction machine 11 will be described with reference to FIGS. 19 to 21. Each step in FIG. 21 corresponds to the procedure of the maintenance method in which the user replaces the recording head 45. When the recording head 45 fails or the useful life of the recording head 45 expires, maintenance such as repairing the recording head 45 or replacing the recording head 45 with a new one is performed.

First, in step S11, in a state where the scanner 20 is fixed to the main body frame 50, the ejection tray 61 is removed toward the second direction TD, which is the in-plane direction of the first frame 51. Specifically, the user loosens the screw 75 with a tool such as a screwdriver to release the fixing between the ejection tray 61 and the pair of stays 58. In a state where the scanner 20 is fixed to the main body frame 50, the user grips the ejection tray 61 and draws out the ejection tray 61 in the second direction TD along the tray rails 71A and 73A. Accordingly, the ejection tray 61 is removed from the main body frame 50.

Next, in step S12, in a state where the scanner 20 is fixed to the main body frame 50, the recording head 45 is removed toward the third direction HD, which is the in-plane direction of the first frame 51. Specifically, the user operates, for example, the operation section 14 or the host device to set the head replacement mode, and instructs the user to move the recording head 45 to the attachment/detachment position PH2. Then, the control section 100 drives the motor 47M to move the recording head 45 to the attachment/detachment position PH2. The recording head 45 ascends to a position where a part is exposed to the opening 50A, which is the outlet thereof. Next, the user removes the recording head 45 from the main body frame 50 by lifting the recording head 45 upward along the rail section 48A.

Manufacturing Method of Multifunction Machine

Figure 22:
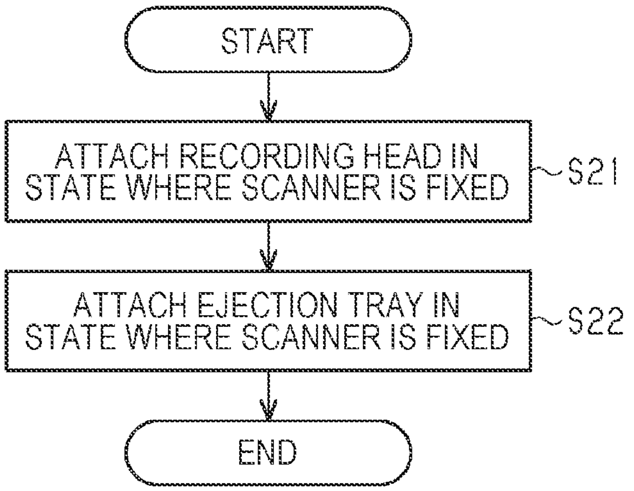
FIG. 22 is a flowchart illustrating a manufacturing method of the multifunction machine.

Next, a manufacturing method of the multifunction machine 11 will be described with reference to FIGS. 19, 20, and 22. Each step of FIG. 22 illustrates the procedure of the manufacturing method of the multifunction machine 11, but is also a procedure when the user attaches the repaired recording head or the new recording head 45 in the maintenance method of the multifunction machine 11 in which the user replaces the recording head 45.

First, in step S21, in a state where the scanner 20 is fixed to the main body frame 50, the recording head 45 is attached toward the direction opposite to the third direction HD, which is the in-plane direction of the first frame 51. Specifically, after the roller 46B of the recording head 45 is engaged with the rail section 48A, the recording head 45 is slowly dropped to be input into the main body frame 50. By this input, the roller 46B is guided by the rail section 48A, and accordingly, the recording head 45 moves in the direction opposite to the third direction HD, which is the head removal direction, and is disposed at the attachment/detachment position PH2.

In the next step S22, in a state where the scanner 20 is fixed to the main body frame 50, the ejection tray 61 is attached toward the direction opposite to the second direction TD, which is the in-plane direction of the first frame 51. Specifically, the user grips the ejection tray 61 and slowly pushes the ejection tray 61 along the tray rails 71A and 73A in the direction opposite to the second direction TD. By being guided by the tray rails 71A and 73A, the pair of fitting sections 68 positioned at the tip end portion of the ejection tray 61 in the pushing direction is inserted into the pair of fitting holes 78A on the main body frame 50 side. By pushing the ejection tray 61 to the end, the pair of fitting sections 68 are fitted into the pair of fitting holes 78A. Accordingly, the ejection tray 61 is placed on the placement surface 57A in a state of being positioned in two directions, that is, the Y-axis direction and the Z-axis direction. Next, the user fixes the screw 75 inserted into the screw insertion hole 62C of the attaching bracket 62B at the tip end portion of the ejection tray 61 to the stay 58, and accordingly, the ejection tray 61 can be fixed to the main body frame 50 in a state where the inclined posture is held. The connector 69 of the tray unit 60 is coupled to the connector 77 on the main body frame 50 side while the ejection tray 61 is attached to the main body frame 50 or after the ejection tray 61 is fixed to the main body frame 50.

As described in detail above, according to the present embodiment, the following effects can be obtained.

(1) In the multifunction machine 11, of Z axes orthogonal to the installation surface F of the multifunction machine 11, the multifunction machine 11 side with respect to the installation surface F is a +Z direction and the opposite side is a −Z direction. The multifunction machine 11 includes the main body frame 50 that has the first frame 51 and the second frame 52 which respectively have surfaces parallel to the Z-axis and face each other. The multifunction machine 11 includes the recording head 45 disposed between the first frame 51 and the second frame 52, and is supported by the main body frame 50; and the ejection tray 61 which is fixed to the main body frame 50 on the +Z direction with respect to the recording head 45, and places the medium ejected after being recorded by the recording head 45. Furthermore, the multifunction machine 11 includes the scanner 20 that is fixed to the main body frame 50 on the +Z direction with respect to the ejection tray 61 and forms the ejection space with the ejection tray 61. The recording head 45 performs recording on the medium which is being transported toward the first direction A, which is the in-plane direction of the first frame 51. The ejection tray 61 is configured to be removed toward the second direction TD, which is the in-plane direction of the first frame 51, in a state where the scanner 20 is fixed to the main body frame 50. According to this configuration, since the ejection tray 61 can be removed toward the in-plane direction in a state where the scanner 20 is fixed, it is easy to expose the space between the first frame 51 and the second frame 52. Since it is easy to expose the space between the first and second frames 52, it is easy to replace the recording head 45 between the frames 51 and 52.

The strength of the apparatus can be easily ensured as compared with the configuration in which the frame having the surface is provided with an opening for taking out the recording head. When opening an opening at a part on the surface of the frame, the strength will decrease. In the present embodiment, since it is not necessary to provide an opening for taking out the recording head 45 in the first frame 51 and the second frame 52, it is easy to ensure the strength of the apparatus.

In addition, the frame of the apparatus main body is configured with three upper and lower stages, is configured such that the middle frame for fixing the recording head is slidable with respect to the upper frame and the lower frame to which the scanner is fixed, and is configured such that the work space for sliding the middle frame and removing the recording head is ensured. In a case of the configuration of this comparative example, it is necessary to prevent the apparatus main body from tipping over due to its weight when the middle frame is drawn out. Compared to the configuration of this comparative example, the configuration of the present embodiment stabilizes the posture of the apparatus when the recording head 45 is removed.

(2) A part of the ejection tray 61 is located between the first frame 51 and the second frame 52. According to this configuration, the multifunction machine 11 can be miniaturized in the Z-axis direction. In other words, by inserting the ejection tray 61 between the first and second frames, it is easy to ensure the allowable number of loaded sheets on the ejection tray 61, and it is easy to miniaturize the apparatus in the Z-axis direction.

In the comparative example of the configuration in which the ejection tray 61 is not between the first and second frames 51 and 52, the ejection tray 61 can be moved in the direction intersecting the surface of the first frame 51. However, since it is difficult to slide the ejection tray diagonally with respect to the horizontal and draw out the ejection tray, it is necessary to remove the ejection tray through a path including ascending and horizontal movement to the front. Therefore, it is necessary to ensure an open area on the front surface side of the ejection space DS more than necessary, which causes an increase in size of the multifunction machine 11. On the other hand, in the multifunction machine 11 of the present embodiment, since a part of the ejection tray 61 is located between the first and second frames 51 and 52, the ejection tray 61 can be drawn out diagonally upward with respect to the horizontal. Since a part of the ejection tray 61 can be disposed between the first and second frames 51 and 52, the volume disposed in a place other than the place between the first and second frames 51 and 52 is reduced, and accordingly, it is possible to suppress the increase in size of the multifunction machine 11.

(3) The first frame 51 and the second frame 52 have the head rail 48 that guides the recording head 45 along the Z-axis. The ejection tray 61 covers the head rail 48. According to this configuration, since the head rail 48 is provided, the recording head 45 can be easily moved. Since the ejection tray 61 covers the head rail 48, the head rail 48 can be easily exposed by removing the ejection tray 61 toward the in-plane direction of the first frame 51. Accordingly, the head to be guided by the head rail 48 can be easily replaced.

(4) In a state where the ejection tray 61 covers the head rail 48, the range R1 occupied by the ejection tray 61 in the Z-axis direction partially overlaps with the range R2 occupied by the head rail 48 in the Z-axis direction. According to this configuration, since the recording head 45 and the ejection tray 61 can be brought closer to each other, it is possible to suppress the increase in size in the Z-axis direction.

It is necessary to draw out the ejection tray 61 in a diagonally upward direction with respect to the horizontal because the ejection tray 61 and the head rail 48 have a positional relationship in which only a part of the range occupied in the Z-axis direction overlaps. Therefore, it is easier to prevent a collision between the recording head 45 and the ejection tray 61 as compared with a configuration in which the ejection tray 61 is slid in the horizontal direction.

(5) The first frame 51 opens the ejection space, and the second frame 52 covers the ejection space DS. According to this configuration, since the second frame 52 covers the ejection space DS, the load of the scanner 20 is easily received by the second frame 52. The posture of the scanner 20 is stable. Since the first frame 51 opens the ejection space DS, it is easy to work when fixing the ejection tray 61, and it is easy to access the medium in the ejection space.

Since the feeding mechanism 25 of the automatic document feeding section 22 (ADF) of the scanner 20 is positioned on the +Z direction of the ejection space DS, the center of gravity of the scanner 20 is positioned in the ejection space DS when viewed in a plan view. Therefore, the scanner 20 is supported by the second frame 52 by forming the second frame 52 so as to block the ejection space DS. For example, when the second frame 52 is configured to open the ejection space DS, a part (cross-sectional area) of the second frame 52 that can support the automatic document feeding section 22 is reduced, and thus, the scanner 20 cannot be stably supported. On the other hand, since the second frame 52 is configured to block the ejection space DS, the part of the scanner 20 equipped with the automatic document feeding section 22 on the relatively heavy feeding mechanism 25 side can be supported by the second frame 52. Accordingly, the posture of the scanner 20 is stable.

(6) The ejection tray 61 has the fitting section 68 facing the first side in the second direction TD. The main body frame 50 has the fitting hole 78A as an example of a fitted section facing the second side of the second direction TD. By moving the ejection tray 61 with respect to the main body frame 50 along the second direction TD, the fitting between the fitting section 68 and the fitting hole 78A is released, and due to the fitting, the movement of the ejection tray 61 with respect to the main body frame 50 in the direction intersecting the second direction TD is restricted. According to this configuration, the position of the ejection tray 61 with respect to the main body frame 50 can be defined by the fitting section 68 and the fitting hole 78A. In other words, the positional deviation of the ejection tray 61 with respect to the main body frame 50 can be limited.

(7) The ejection tray 61 is fixed to the surface of the main body frame 50 facing the second direction TD with the screws 75. According to this configuration, it is easy to perform the screw fixing work from the second direction TD.

(8) The second tray rail 73A that guides the ejection tray 61 along the second direction TD is fixed to the second frame 52. According to this configuration, since the ejection tray 61 can be moved along the second tray rail 73A, it is easy to remove or install the ejection tray 61.

(9) The second rail member 72 having the second tray rail 73A forms the ejection space DS. According to this configuration, since the second rail member 72 has a function of forming the ejection space DS, the number of components can be reduced. For example, the rail member 72 does not have a function of forming the wall surface of the ejection space DS, and the number of components can be reduced as compared with a case where another member that forms the ejection space DS is newly added.

(10) The second tray rail 73A guides the ejection tray 61 toward the +Z direction as going downstream in the ejecting direction. The recording head 45 moves toward the +Z direction as going downstream in the ejecting direction. According to this configuration, since the direction of the guide of the second tray rail 73A and the direction of movement of the recording head 45 are similar, it is easy to dispose the respective spaces at high density. Therefore, it is easy to miniaturize the multifunction machine 11 in the Z-axis direction.

(11) The ejection tray 61 is inclined toward the +Z direction as going downstream in the ejecting direction. According to this configuration, it is easy to provide a space on the −Z direction of the ejection tray 61 from the direction in which the ejection tray 61 is inclined. A mechanism other than the ejection tray 61 can be disposed there.

(12) The ejection tray 61 is inclined toward the +Z direction as going downstream in the ejecting direction. The recording head 45 moves toward the +Z direction as going downstream in the ejecting direction. According to this configuration, the direction of inclination of the ejection tray 61 and the direction of movement of the recording head 45 are similar, and thus, the respective spaces (the space for disposing the ejection tray 61 and the moving direction of the recording head 45) are densely arranged. Therefore, it is easy to miniaturize the apparatus in the Z-axis direction.

(13) The recording head 45 is configured to be removed toward the third direction HD, which is the in-plane direction of the first frame 51, in a state where the scanner 20 is fixed to the main body frame 50 after the ejection tray 61 is removed. According to this configuration, it is easy to replace the recording head 45 disposed between the frames 51 and 52.

(14) This is a maintenance method of the multifunction machine 11. In a state where the scanner 20 is fixed to the main body frame 50, the ejection tray 61 is removed toward the second direction TD, which is the in-plane direction of the first frame 51 (step S11). In a state where the scanner 20 is fixed to the main body frame 50, the recording head 45 is removed toward the third direction HD, which is the in-plane direction of the first frame 51 (step S12). According to this method, it is not necessary to remove the scanner 20 in order to remove the recording head 45, and thus, the recording head 45 can be easily removed. Therefore, it is easy to perform maintenance on the multifunction machine 11.

(15) This is a manufacturing method of the multifunction machine 11. In a state where the scanner 20 is fixed to the main body frame 50, the recording head 45 is attached toward the third direction HD, which is the in-plane direction of the first frame 51 (step S21). In a state where the scanner 20 is fixed to the main body frame 50, the ejection tray 61 is attached toward the second direction TD, which is the in-plane direction of the first frame 51 (step S22). According to this method, at the time of manufacturing the multifunction machine 11, the scanner 20 is first fixed to the main body frame 50, and then the recording head 45 can be attached to the main body frame 50. By attaching the recording head 45, which is a delicate component, afterwards, it is possible to avoid giving an impact to the recording head 45 when attaching a large component such as the scanner 20 and the like to the main body frame 50. In other words, the recording head 45, which is a delicate component, is less likely to receive an impact in a case of being attached later as much as possible, and it is easy to define the attachment order of the recording head 45 in the order of being less likely to receive such an impact. Further, in this manufacturing method, a manufacturing method (maintenance method) for maintenance by attaching the maintained recording head 45 or a new recording head 45 to the main body frame 50 after the recording head 45 is removed by maintenance (for example, the maintenance method of the above-described multifunction machine 11) for replacing the recording head 45, is included. In this case, it is not necessary to remove the scanner 20 in order to attach the recording head 45, and thus, the recording head 45 can be easily attached. Therefore, it is easy to perform maintenance on the multifunction machine 11.

The above-described embodiments can also be changed to an aspect such as the modification example illustrated below. Furthermore, a further modification example may also be an appropriate combination of the above-described embodiment and the modification examples illustrated below, or an appropriate combination of the modification examples illustrated below may be a further modification example.

The ejection tray 61 takes an aspect of a tray unit including a driving source that realizes functions other than the function of the tray on which the medium M to be ejected is loaded, but may be an ejection tray having only the tray function without taking an aspect of the tray unit.

The recording head 45 is configured as a unit including a part of an ascending/descending mechanism such as the rack 46A and the roller 46B, and is configured to move between the recording position PH1 and the attachment/detachment position PH2, but may be the recording head 45 having a configuration of not moving to the attachment/detachment position PH2. In this case, the recording head 45 may be movably supported by the main body frame 50 to a position necessary for the recording function such as a capping position other than the attachment/detachment position PH2, or may be fixed to the main body frame 50. Even with these configurations, it is possible to remove the recording head 45 from the opening 50A exposed by removing the ejection tray 61.

The scanner 20 includes the automatic document feeding section 22, but the scanner 20 may not include the automatic document feeding section 22. In other words, the scanner 20 may be configured with the document holder 21 and the document holder cover 23.

Although the feeding section of the automatic document feeding section 22 is positioned above the ejection space DS, the document tray 24 of the automatic document feeding section 22 may be positioned above the ejection space DS.

The head rail 48 is sufficient as long as the head rail 48 has a rail part that guides along the Z-axis. The head rail 48 may be guided in a direction other than the direction parallel to the Z-axis. The direction in which the head rail 48 guides the recording head 45 may have at least a Z-axis component.

The head rail 48 may be formed by fixing a resin-molded plastic rail member to the first and second frames 51 and 52, or by bending the first and second frames 51 and 52.

The number of tray rails is not limited to a pair, and may be only one. For example, only the second tray rail provided along the surface of the second frame 52 may be provided as one tray rail.

The main body frame 50 is not limited to being made of metal, and a part or all thereof may be made of a member made of carbon fiber reinforced plastic. For example, the main body frame 50 may be a rigid body made of carbon fiber reinforced plastic.

The first direction A and the second direction TD may be the same or different.

The first direction A and the third direction HD may be the same or different.

The second direction TD and the third direction HD may be the same or different.

In the above-described embodiment, the ejection tray 61 is configured to be removed toward the in-plane direction of the first frame 51, but may be configured to be removed toward the in-plane direction of the surface orthogonal to the surface of the first frame 51. The ejection space DS is open on the +X direction, which is the direction toward the downstream in the ejecting direction, and the −Y direction, which is the direction toward the front surface of the multifunction machine 11. The removal direction of the ejection tray 61 may be set in a direction in which the user can draw out the ejection tray 61 from the opening of the ejection space DS.

Fixing of the scanner 20 to the main body frame 50 is not limited to screw fixing, and may be welding. Further, a combination of welding and screw fixing may be used. In addition, fixing with an adhesive such as a strong adhesive may be included.

The main body frame 50 may have a surface perpendicular to the Z-axis as well as a surface parallel to the Z-axis. Further, the main body frame 50 may be configured with one member or may be configured with a plurality of members.

The recording head is not limited to the line head, and may be a serial recording type recording head. In the serial recording method, a recording head is provided on a carriage that can reciprocate in the main scanning direction, and the recording head performs recording on the medium M in the process of moving in the width direction of the medium M. In the serial recording method, the transport operation in which the transport mechanism 30 transports the medium M to the next recording position, and the recording operation in which the recording head performs recording at the next recording position of the medium M by moving the carriage in the main scanning direction, are alternately performed. In such a serial recording method, the scanning mechanism that movably supports the carriage is fixed between the first frame 51 and the second frame 52, and accordingly, the recording head 45 is supported by the first frame 51 and the second frame 52.

In the above-described embodiment, the recording head 45 is removed from the opening 50A of the main body frame 50, which is exposed when the ejection tray 61 is removed, in a state where the scanner 20 is fixed. However, in addition to the recording head 45, the cap carriage 49 may also be removed from the opening 50A in a state where the scanner 20 is fixed. In addition to the recording head 45, the wiper carriage (not illustrated) may be configured to be removed from the opening 50A in a state where the scanner 20 is fixed. One of the recording head 45, the cap carriage 49, and the wiper carriage may be removed from the opening 50A in a state where the scanner 20 is fixed.

In the multifunction machine 11, the second cover 17 may be provided with a transport-in port that can be coupled to a large-capacity paper feed unit that is an external feeding device, and the medium M may be fed through the transport path T in the apparatus main body 12 via the transport-in port from the large-capacity paper feed unit.

The medium M is not limited to cut sheet paper, but may be roll paper. The medium M is not limited to a paper sheet, and may be a sheet or a film made of plastic, metal, laminate, or ceramic. Furthermore, the medium M may be a cloth (including a woven fabric, a non-woven fabric, and a knitted fabric).

Hereinafter, the technical idea grasped from the embodiment and the modification examples described above and the action effects thereof will be described.

(A) There is provided a multifunction machine including when in a Z-axis orthogonal to an installation surface of the multifunction machine, a multifunction machine side with respect to the installation surface is defined as a +Z direction and an opposite side is defined as a −Z direction, a main body frame having a first frame and a second frame which respectively have surfaces parallel to the Z-axis and face each other; a recording head disposed between the first frame and the second frame and supported by the main body frame; an ejection tray which is fixed to the main body frame on the +Z direction with respect to the recording head and on which a medium ejected after being recorded by the recording head is placed; and a scanner fixed to the main body frame on the +Z direction with respect to the ejection tray and forming an ejection space with the ejection tray, in which the recording head performs recording on the medium transported toward a first direction, which is an in-plane direction of the first frame, and the ejection tray is configured to be removed toward a second direction, which is the in-plane direction of the first frame, in a state where the scanner is fixed to the main body frame.

According to this configuration, since the ejection tray can be removed toward the in-plane direction in a state where the scanner is fixed, it is easy to expose the space between the first frame and the second frame. Since it is easy to expose the space between the first and second frames, it is easy to replace the recording head between the frames.

(B) In the multifunction machine, a part of the ejection tray may be located between the first frame and the second frame.

According to this configuration, the multifunction machine can be miniaturized in the Z-axis direction. In other words, by inserting the ejection tray between the first and second frames, it is easy to ensure the allowable number of loaded sheets on the ejection tray, and it is easy to miniaturize the apparatus in the Z-axis direction.

(C) In the multifunction machine, the first frame and the second frame may have head rails that guide the recording head along the Z-axis, and the ejection tray may cover the head rail.

According to this configuration, since the head rail is provided, the recording head can be easily moved. Since the ejection tray covers the head rail, the head rail can be easily exposed by removing the ejection tray toward the in-plane direction of the first frame. Accordingly, the head to be guided by the head rail can be easily replaced.

(D) In the multifunction machine, a range occupied by the ejection tray in the Z-axis direction may partially overlap with a range occupied by the head rail in the Z-axis direction, in a state where the ejection tray covers the head rail.

According to this configuration, since the recording head and the ejection tray can be brought closer to each other, it is possible to suppress the miniaturization in the Z-axis direction.

(E) In the multifunction machine, the first frame may open the ejection space, and the second frame may cover the ejection space.

According to this configuration, since the second frame covers the ejection space, the load of the scanner is easily received by the second frame. The posture of the scanner is stable. Since the first frame opens the ejection space, it is easy to work when fixing the ejection tray, and it is easy to access the medium in the ejection space.

(F) In the multifunction machine, the ejection tray may have a fitting section facing a first side of the second direction, the main body frame may have a fitted section facing a second side of the second direction, fitting between the fitting section and the fitted section may be released by moving the ejection tray with respect to the main body frame along the second direction, and movement of the ejection tray with respect to the main body frame in the direction intersecting the second direction may be restricted by the fitting.

According to this configuration, the position of the ejection tray with respect to the main body frame can be defined by the fitting section and the fitted section. In other words, the positional deviation of the ejection tray with respect to the main body frame can be limited.

(G) In the multifunction machine, the ejection tray may be fixed to the surface of the main body frame facing the second direction with the screws. According to this configuration, it is easy to perform the screw fixing work from the second direction.

(H) In the multifunction machine, the tray rail that guides the ejection tray along the second direction may be fixed to the second frame.

According to this configuration, the ejection tray can be moved along the rail, and thus, it is easy to remove or install the ejection tray.

(I) In the multifunction machine, the rail member having the tray rail may form the ejection space.

According to this configuration, since the rail member has a function of forming the ejection space, the number of components can be reduced.

(J) In the multifunction machine, the tray rail may guide the ejection tray toward the +Z direction as going downstream in an ejecting direction of the medium, and the recording head may move toward the +Z direction as going downstream in the ejecting direction.

According to this configuration, since the direction of the guide of the tray rail and the direction of movement of the recording head are similar, it is easy to dispose the respective spaces at high density. Therefore, it is easy to miniaturize the apparatus in the Z-axis direction.

(K) In the multifunction machine, the ejection tray may be inclined toward the +Z direction as going downstream in the ejecting direction.

According to this configuration, it is easy to provide a space on the −Z direction of the ejection tray from the direction in which the ejection tray is inclined. A mechanism other than the ejection tray can be disposed there.

(L) In the multifunction machine, the ejection tray may be inclined toward the +Z direction as going downstream in the ejecting direction, and the recording head may move toward the +Z direction as going downstream in the ejecting direction.

According to this configuration, the direction of inclination of the ejection tray and the direction of movement of the recording head are similar, and thus, the respective spaces (the space for disposing the ejection tray and the moving direction of the recording head) are densely arranged. Therefore, it is easy to miniaturize the apparatus in the Z-axis direction.

(M) In the multifunction machine, the recording head may be configured to be removed toward a third direction, which is the in-plane direction of the first frame, in a state where the scanner is fixed to the main body frame after the ejection tray is removed.

According to this configuration, it is easy to replace the recording head disposed between the frames.

(N) There is provided a maintenance method of the multifunction machine, the method including: removing the ejection tray toward the second direction, which is the in-plane direction of the first frame, in a state where the scanner is fixed to the main body frame; and removing the recording head toward a third direction, which is the in-plane direction of the first frame, in a state where the scanner is fixed to the main body frame.

According to this configuration, it is not necessary to remove the scanner in order to remove the recording head, and thus, the recording head can be easily removed. Therefore, it is easy to perform maintenance on the multifunction machine.

(O) There is provided a manufacturing method of a multifunction machine, the method including: attaching the recording head toward a third direction, which is the in-plane direction of the first frame, in a state where the scanner is fixed to the main body frame; and attaching the ejection tray toward the second direction, which is the in-plane direction of the first frame, in a state where the scanner is fixed to the main body frame.

According to this method, at the time of manufacturing the multifunction machine, the scanner is first fixed to the main body frame, and then the recording head can be attached to the main body frame. By attaching the recording head, which is a delicate component, afterwards, it is possible to avoid giving an impact to the recording head when attaching a large component such as the scanner to the main body frame. In other words, the recording head, which is a delicate component, is less likely to receive an impact in a case of being attached later as much as possible, and it is easy to define the attachment order of the recording head in the order of being less likely to receive such an impact.

Further, in this manufacturing method, a manufacturing method (maintenance method) for maintenance by attaching the maintained recording head or a new recording head to the main body frame after the recording head is removed by maintenance (for example, the maintenance method of the above-described multifunction machine) for replacing the recording head, is included. In this case, it is not necessary to remove the scanner in order to attach the recording head, and thus, the recording head can be easily attached. Therefore, it is easy to perform maintenance on the multifunction machine.

What is claimed is:

1. A multifunction machine comprising: when in a Z axis orthogonal to an installation surface of the multifunction machine, a multifunction machine side with respect to the installation surface is defined as a +Z direction and an opposite side is defined as a −Z direction,
- a main body frame having a first frame and a second frame which respectively have surfaces parallel to the Z-axis and face each other;
- a recording head disposed between the first frame and the second frame and supported by the main body frame;
- an ejection tray which is fixed to the main body frame on the +Z direction with respect to the recording head and on which a medium ejected after being recorded by the recording head is placed; and
- a scanner fixed to the main body frame on the +Z direction with respect to the ejection tray and forming an ejection space with the ejection tray, wherein
- the ejection tray is configured to be removed toward a second direction, which is an in-plane direction of the first frame, in a state where the scanner is fixed to the main body frame, and
- the recording head is configured to be removed toward a third direction, which is the in-plane direction of the first frame, in a state where the scanner is fixed to the main body frame after the ejection tray is removed.

2. The multifunction machine according to claim 1, wherein
- a part of the ejection tray is located between the first frame and the second frame.

3. The multifunction machine according to claim 2, wherein
- the first frame and the second frame have head rails that guide the recording head along the Z-axis, and
- the ejection tray covers the head rail.

4. The multifunction machine according to claim 3, wherein
- a range occupied by the ejection tray in a Z-axis direction partially overlaps with a range occupied by the head rail in the Z-axis direction, in a state where the ejection tray covers the head rail.

5. The multifunction machine according to claim 2, wherein the first frame opens the ejection space, and the second frame covers the ejection space.

6. The multifunction machine according to claim 1, wherein the ejection tray has a fitting section facing a first side of the second direction, the main body frame has a fitted section facing a second side of the second direction, and in the ejection tray, movement to a direction intersecting the second direction with respect to the main body frame is restricted as the fitting section is fitted to the fitted section, and fitting between the fitting section and the fitted section is released by being moved toward the second direction.

7. The multifunction machine according to claim 1, wherein the ejection tray is fixed to a surface facing the second direction among surfaces of the main body frame with screws.

8. The multifunction machine according to claim 1, wherein a tray rail that guides the ejection tray along the second direction is fixed to the second frame.

9. The multifunction machine according to claim 8, wherein a rail member having the tray rail forms the ejection space.

10. The multifunction machine according to claim 8, wherein the tray rail guides the ejection tray toward the +Z direction as going downstream in an ejecting direction of the medium, and the recording head moves toward the +Z direction as going downstream in the ejecting direction.

11. The multifunction machine according to claim 10, wherein the ejection tray is inclined toward the +Z direction as going downstream in the ejecting direction of the medium.

12. The multifunction machine according to claim 1, wherein the ejection tray is inclined toward the +Z direction as going downstream in an ejecting direction of the medium, and the recording head moves toward the +Z direction as going downstream in the ejecting direction.

13. A maintenance method of the multifunction machine according to claim 1, the method comprising:

removing the ejection tray toward the second direction, which is the in-plane direction of the first frame, in a state where the scanner is fixed to the main body frame; and removing the recording head toward a third direction, which is the in-plane direction of the first frame, in a state where the scanner is fixed to the main body frame.

14. A manufacturing method of the multifunction machine according to claim 1, the method comprising:

attaching the recording head toward a third direction, which is the in-plane direction of the first frame, in a state where the scanner is fixed to the main body frame; and attaching the ejection tray toward the second direction, which is the in-plane direction of the first frame, in a state where the scanner is fixed to the main body frame.

15. A multifunction machine comprising: when in a Z axis orthogonal to an installation surface of the multifunction machine, a multifunction machine side with respect to the installation surface is defined as a +Z direction and an opposite side is defined as a −Z direction, a main body frame having a first frame and a second frame which respectively have surfaces parallel to the Z-axis and face each other;

a recording head disposed between the first frame and the second frame and supported by the main body frame;

an ejection tray which is fixed to the main body frame on the +Z direction with respect to the recording head and on which a medium ejected after being recorded by the recording head is placed; and a scanner fixed to the main body frame on the +Z direction with respect to the ejection tray and forming an ejection space with the ejection tray, wherein the ejection tray is configured to be removed toward a second direction, which is an in-plane direction of the first frame, in a state where the scanner is fixed to the main body frame, the ejection tray is inclined toward the +Z direction as going downstream in an ejecting direction of the medium, and the recording head moves toward the +Z direction as going downstream in the ejecting direction.

16. A multifunction machine comprising: when in a Z axis orthogonal to an installation surface of the multifunction machine, a multifunction machine side with respect to the installation surface is defined as a +Z direction and an opposite side is defined as a −Z direction, a main body frame having a first frame and a second frame which respectively have surfaces parallel to the Z-axis and face each other;

a recording head disposed between the first frame and the second frame and supported by the main body frame;

an ejection tray which is fixed to the main body frame on the +Z direction with respect to the recording head and on which a medium ejected after being recorded by the recording head is placed; and a scanner fixed to the main body frame on the +Z direction with respect to the ejection tray and forming an ejection space with the ejection tray, wherein the ejection tray is configured to be removed toward a second direction, which is an in-plane direction of the first frame, in a state where the scanner is fixed to the main body frame, the first frame and the second frame have head rails that guide the recording head along the Z-axis, the ejection tray covers the head rail, and a range occupied by the ejection tray in a Z-axis direction partially overlaps with a range occupied by the head rail in the Z-axis direction, in a state where the ejection tray covers the head rail.

* * * * *